(12) United States Patent
Braun et al.

(10) Patent No.: US 7,735,833 B2
(45) Date of Patent: Jun. 15, 2010

(54) DOUBLE PADDED FINGER SEAL

(75) Inventors: Minel J. Braun, Akron, OH (US); Hazel Marie, Boardman, OH (US); Ian Smith, Cuyahoga Falls, OH (US)

(73) Assignee: The University of Akron, Akron, OH (US)

( * ) Notice: Subject to any disclaimer, the term of this patent is extended or adjusted under 35 U.S.C. 154(b) by 387 days.

(21) Appl. No.: 11/939,964

(22) Filed: Nov. 14, 2007

(65) Prior Publication Data
US 2008/0122183 A1    May 29, 2008

Related U.S. Application Data

(60) Provisional application No. 60/858,890, filed on Nov. 14, 2006.

(51) Int. Cl.
*F16J 15/44* (2006.01)
(52) U.S. Cl. ............................... 277/355; 277/301
(58) Field of Classification Search ............. 277/355, 277/301, 303
See application file for complete search history.

(56) References Cited

U.S. PATENT DOCUMENTS

| | | | |
|---|---|---|---|
| 2,124,108 A | 7/1938 | Grece |
| 3,576,328 A | 4/1971 | Vose |
| 3,970,319 A | 7/1976 | Carroll |
| 4,645,217 A | 2/1987 | Honeycutt |
| 4,678,113 A | 7/1987 | Bridges |
| 4,738,453 A | 4/1988 | Ide |
| 4,756,536 A | 7/1988 | Belcher |
| 5,031,922 A | 7/1991 | Heydrich |
| 5,042,823 A | 8/1991 | Mackay |
| 5,071,138 A | 12/1991 | Mackay |
| 5,100,158 A | 3/1992 | Gardner |
| 5,108,116 A | 4/1992 | Johnson |
| 5,169,159 A | 12/1992 | Pope |
| 5,174,584 A | 12/1992 | Lahrman |
| 5,246,295 A | 9/1993 | Ide |
| 5,370,402 A | 12/1994 | Gardner |
| 5,385,409 A | 1/1995 | Ide |
| 5,401,036 A | 3/1995 | Basu |
| 5,474,305 A | 12/1995 | Flower |

(Continued)

OTHER PUBLICATIONS

Arora, Gul K., "Pressure Balanced, Low Hysteresis, Finger Seal Test . . . " AIAA Paper No. 99-2686, AIAA/SAE/ASME/ASEE 35th Joint Propulsion Conference, Los Angeles, CA, Jun. 1999.

(Continued)

*Primary Examiner*—Thomas B Will
*Assistant Examiner*—Gilbert Y Lee
(74) *Attorney, Agent, or Firm*—Joseph J. Crimaldi; Roetzel & Andress

(57) ABSTRACT

The present invention generally relates to sealing devices used in conjunction with two relatively rotatable members and having a fluid seal there between. Finger seals are utilized to achieve sealing between a rotating member and a stationary member. As such the present invention involves a double padded finger seal with both pads oriented axially in the same direction. The sealing apparatus may optionally utilize a padless third laminate. In other embodiments, the present invention provides variations of the basic double padded finger seal with pad configurations utilizing various arrangements and geometries of the padded area.

24 Claims, 19 Drawing Sheets

U.S. PATENT DOCUMENTS

| | | |
|---|---|---|
| 5,558,341 A | 9/1996 | McNickle |
| 5,632,493 A | 5/1997 | Gardner |
| 5,755,445 A | 5/1998 | Arora |
| 5,911,400 A | 6/1999 | Niethammer |
| 5,961,279 A | 10/1999 | Ingistov |
| 6,196,550 B1 | 3/2001 | Arora |
| 6,364,316 B1 | 4/2002 | Arora |
| 6,601,853 B2 * | 8/2003 | Inoue ......................... 277/355 |
| 6,736,401 B2 * | 5/2004 | Chung et al. ................. 277/355 |
| 6,805,356 B2 * | 10/2004 | Inoue ......................... 277/355 |
| 6,811,154 B2 | 11/2004 | Proctor |
| 6,935,631 B2 * | 8/2005 | Inoue ......................... 277/355 |
| 2003/0025274 A1 * | 2/2003 | Allan et al. ................. 277/355 |
| 2003/0042682 A1 * | 3/2003 | Inoue ......................... 277/355 |
| 2003/0062684 A1 * | 4/2003 | Inoue ......................... 277/355 |
| 2003/0062685 A1 * | 4/2003 | Inoue ......................... 277/355 |
| 2005/0046113 A1 * | 3/2005 | Inoue ......................... 277/355 |

OTHER PUBLICATIONS

Proctor, Margaret P., "High Speed, High Temperature Finger Seal . . . ", AIAA Paper No. 2002-3792, AIAA/SAE/ASME/ASEE 38th Joint Propulsion Conference, Indianapolis, IN, Jul. 2002.

* cited by examiner

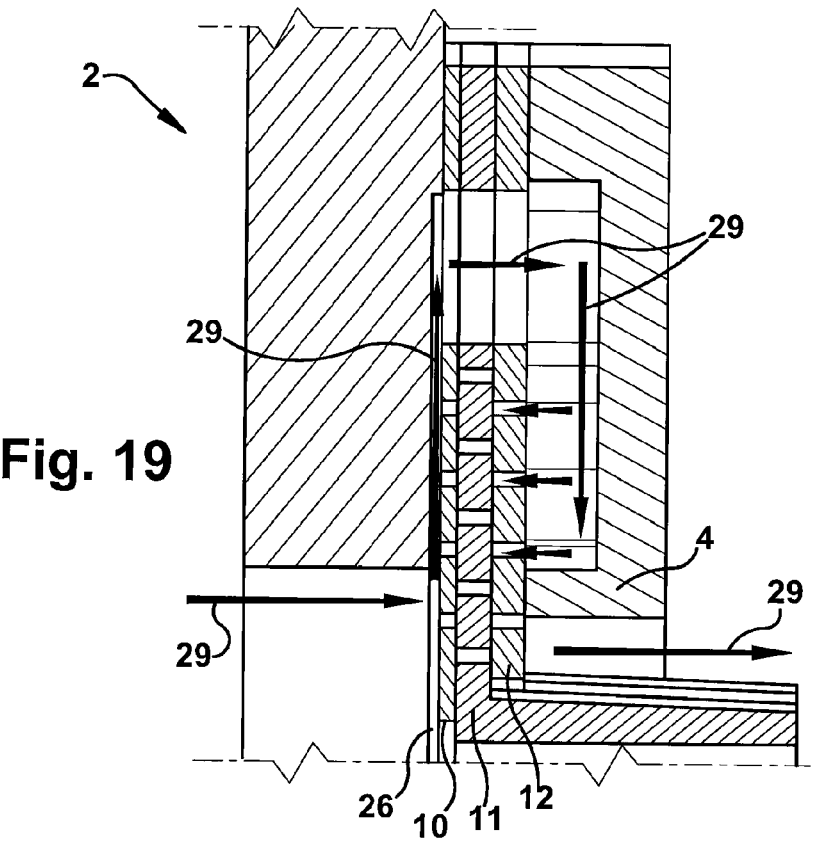
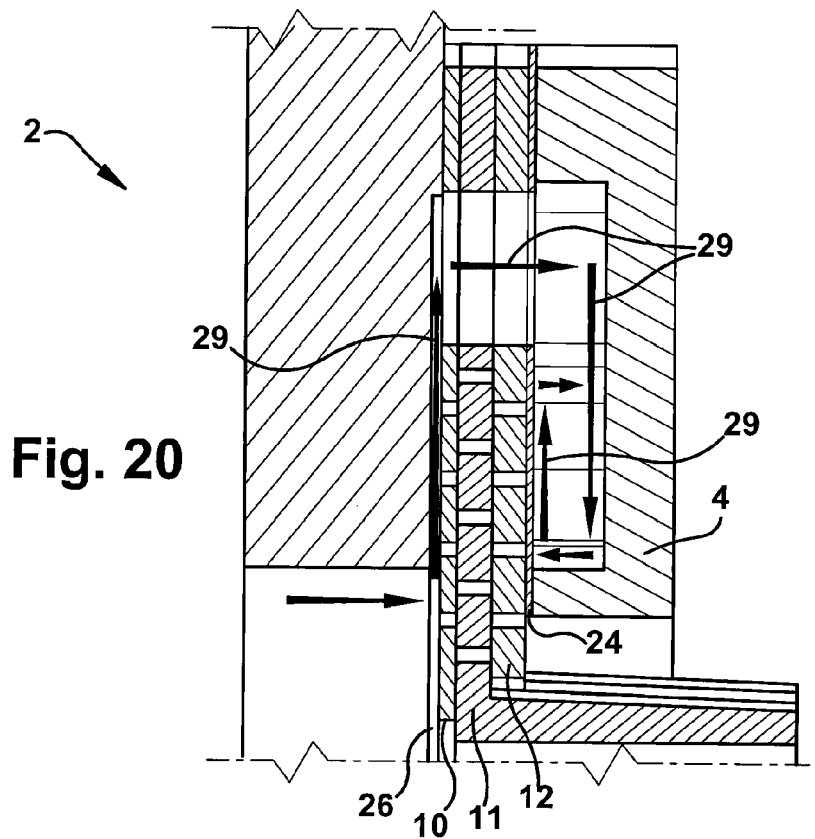

DOUBLE PADDED FINGER SEAL

RELATED APPLICATION DATA

This application claims priority to previously filed U.S. Provisional Patent Application No. 60/858,890, filed on Nov. 14, 2006, entitled "A Novel Zero Contact Seal," which is incorporated by reference herein in its entirety.

BACKGROUND OF THE INVENTION

Seals are essential for the proper operation of a wide variety of devices including, but not limited to, turbines and compressors. Accordingly, seals find uses in a wide variety of locations. Specifically, their use at the interface between a turbine or compressor shaft and one or more stationary parts adjacent to the shaft are important to both the efficiency and operation of such devices. As with any mechanical device, continued use and wear results in a number of issues and/or cumulative negative effects. For example, leakages create a substantial effect on engine specific fuel consumption (SFC). For example, an average SFC increase of over 1% annually in large turbofan engines can generally be attributed to the wear and erosion of the seals. Leakage due to internal-flow systems of these engines has accounted for up to a 17% loss in power and over 7% increases in SFC.

The classical sealing technology for gas turbines or compressors used rigid seals such as cylindrical, labyrinth, or honeycomb seals. Presently, the labyrinth seal is the most common type of shaft seal with a combination of honeycomb seals and labyrinth seals used primarily as blade tip seals. The effectiveness of these types of seals depends on the radial clearance between the rotating and stationary parts as well as the number of seal stages, these factors being the main design conundrum for rigid seals. While a small clearance assures better sealing, differential thermal expansion, or dynamic excursions of the shaft associated with operational maneuvers, start-up or coast-down cause rubbing and wear damage at the interface between the stationary and rotating areas. Consequently, interstage or other type of leakage may increase with a resulting decrease in the engine efficiency. With linear speeds of near 1000 ft/sec, such rubbing contact and resulting interface wear will produce steady deterioration that may result in possible catastrophic failure.

Mitigation of such an environment occurs only if the seal interface becomes compliant and is able to follow the blade tip or shaft surface in its excursion/movement without being damaged thus avoiding the above mentioned consequences to the seal leakage effectiveness.

One of the first successful compliant seals with applications for the high temperature, high speed, and high pressure environment of a gas turbine/compressor involved the brush seal introduced in the early to mid-1980s. While a brush seal provides a good answer to compliance requirements and has become a serious competitor to labyrinth seals, there are also negative aspects engendered by the nature of the mechanics and operation of same. One such aspect involves the mounting of the brush seal with a significant preload onto a shaft, thus creating significant interface frictional and wear issues, as well as the significant heating of the bristle tips, sometimes to such temperatures that the tips get welded to the shaft. Another significant problem involves the dislodging of a bristle from the brush pack and its eventual entrainment within the power stream. Thus, while a brush seal does provide the compliance needed, it also brings about full contact with a rotating surface thereby resulting in a number of detrimental operational and structural problems.

Accordingly, there is a need in the art for improvement upon the brush seal whereby one maintains the advantages of the brush seal while improving efficiency.

SUMMARY OF THE INVENTION

The present invention generally relates to sealing devices used in conjunction with two relatively rotatable members and having a fluid seal there between. Finger seals are utilized to achieve sealing between a rotating member and a stationary member. As such, the present invention involves a double padded finger seal with both pads oriented axially in the same direction. The sealing apparatus may optionally utilize a padless third laminate. In other embodiments, the present invention provides variations of the basic double padded finger seal with pad configurations utilizing various arrangements and geometries of the padded area.

In one embodiment the present invention discloses an annular sealing apparatus comprising a body defining a cylindrical opening designed to receive a rotating member, the cylindrical opening and the rotating member bounding a high pressure fluid region and a relatively lower pressure fluid region there between and inhibiting fluid leakage between the high fluid pressure region and lower fluid pressure region, a backplate having a manifold with protrusions in the manifold plane, a frontplate with a circumferentially and radially oriented recess directing flow, at least two finger seal laminates interposed between high and lower fluid pressure regions, the at least two finger seal laminates containing compliant finger seals, one of the at least two finger seal laminates defining a cavity, the at least two finger seal laminates forming a passageway between the high fluid pressure and low fluid pressure regions, the finger seals circumferentially extending finger elements wherein the finger elements each include a plurality of spaced integral fingers and wherein the fingers define gaps there between, the finger seals positioned such that the fingers of each laminate extend from a common torus, the torus containing holes to equalize pressure, the finger seals of adjoining finger seal laminates positioned such that the fingers of each laminate block any gaps of the adjacent laminate to reduce fluid leakage and allow for pressure equalization, the finger seals each containing at least one lift pad extending from the respective finger elements, the lift pads adapted to be arranged circumferentially and axially adjacent to a rotating member whereby each lift pad is operative to be self acting to create hydrodynamic lift when the rotating member reaches a sufficient rotating speed or the hydrostatic axial pressure differential reaches a sufficient level, and the lift pads of the circumferentially adjoining laminates being interlaced and upon lift engaging one another in an interlocking manner.

In another embodiment the present invention relates to a front plate for an annular sealing mechanism comprising circumferentially and radially oriented recesses redirecting flow between high pressure and low pressure zones.

In still yet another embodiment the present invention relates to a method of inhibiting fluid leakage between a high pressure and a relatively lower pressure region comprising the steps of providing an annular sealing apparatus comprising a body defining a cylindrical opening designed to receive a rotating member, the cylindrical opening and the rotating member bounding a high pressure fluid region and a relatively lower pressure fluid region there between and inhibiting fluid leakage between the high fluid pressure region and lower fluid pressure region, a backplate having a manifold with protrusions in the manifold plane, a frontplate with a circumferentially and radially oriented recess directing flow, at least two finger seal laminates interposed between high and lower fluid pressure regions, the at least two finger seal laminates containing compliant finger seals, one of the at least two finger seal laminates defining a cavity, the at least two finger seal laminates forming a passageway between the high fluid pressure and low fluid pressure regions, the finger seals circumferentially extending finger elements wherein the finger elements each include a plurality of spaced integral fingers and wherein the fingers define gaps there between, the finger seals positioned such that the fingers of each laminate extend from a common torus, the torus containing holes to equalize pressure, the finger seals of adjoining finger seal laminates positioned such that the fingers of each laminate block any gaps of the adjacent laminate to reduce fluid leakage and allow for pressure equalization, the finger seals each containing at least one lift pad extending from the respective finger elements, the lift pads adapted to be arranged circumferentially and axially adjacent to a rotating member whereby each lift pad is operative to be self acting to create hydrodynamic lift when the rotating member reaches a sufficient rotating speed or the hydrostatic axial pressure differential reaches a sufficient level, and the lift pads of the circumferentially adjoining laminates being interlaced and upon lift engaging one another in an interlocking manner, and preventing the fluid from flowing from the high pressure region to the low pressure region.

BRIEF DESCRIPTION OF THE DRAWINGS

FIG. 19 is a side view detailing the fluid flow through the standard embodiment of the sealing apparatus;

FIG. 20 is a side view detailing the fluid flow through an alternate embodiment of the sealing apparatus;

DETAILED DESCRIPTION OF THE INVENTION

The present invention generally relates to sealing devices used in conjunction with two relatively rotatable members and having a fluid seal there between. Finger seals are utilized to achieve sealing between a rotating member and a stationary member. As such the present invention involves a double padded finger seal with both pads oriented axially in the same direction. The sealing apparatus may optionally utilize a padless third laminate. In other embodiments, the present invention provides variations of the basic double padded finger seal with pad configurations utilizing various arrangements and geometries of the padded area.

The present invention generally relates to sealing devices used in conjunction with two relatively rotatable members and having a fluid seal there between. Finger seals are utilized to achieve sealing between a rotating member and a stationary member. Such seals involve a double padded finger seal with an optional padless third laminate. In additional embodiments, the present invention offers variations of the finger seal and pad configurations by utilizing various arrangements and geometries of the padded area. The entire sealing apparatus 2 defining a cylindrical opening is designed for receiving a rotating member 25 such as, but not limited to a shaft.

Figure 1:
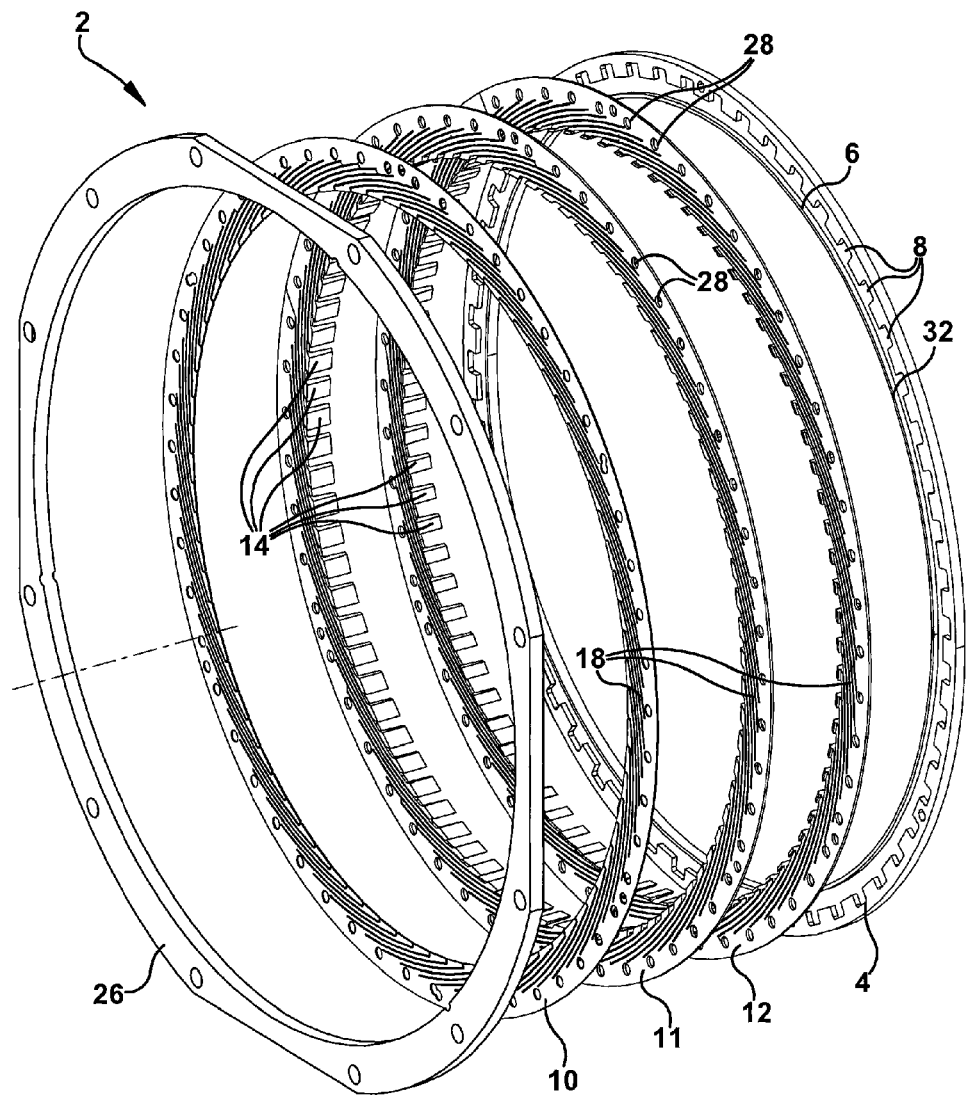
FIG. 1 is a drawing of the sealing apparatus detailing the plates and laminates.

FIG. 1 provides a standard sealing apparatus 2 as used in an embodiment such as, but not limited to, a gas turbine or compressor. This standard sealing apparatus defines a backplate 4, with the backplate having a pressure dam 6, and a pressure manifold 8. In one embodiment a high pressure laminate 10 and a low pressure laminate 11, 12 are stacked next to backplate 4. The high pressure laminate 10 typically is a padless seal laminate, and low pressure laminates 11, 12 contain fingers 18 ending with padded seals 14. In various embodiments, one or more spacers are added in between laminates and/or adjacent to the backplate 4 and adjacent to any frontplate 26. The plates are held together by a fastening means. Examples of such fastening means include, but are not limited to welding, rivets, bolts, glue, adhesives, and screws.

In one embodiment the backplate 4 is designed so as to allow a pressure equalization and improve fluid flow and efficiency.

This standard sealing apparatus 2 being placed between a housing and a rotating member. This provides a seal and prevents fluid communication between high and low pressure cavities or zones.

The makeup and arrangement of the front plate 26 also being important to the fluid flow. Various embodiments direct the fluid flow about sealing apparatus 2. In one embodiment the front plate 26 includes a recess of between approximately 0.005 and 0.010 inches.

Figure 2:
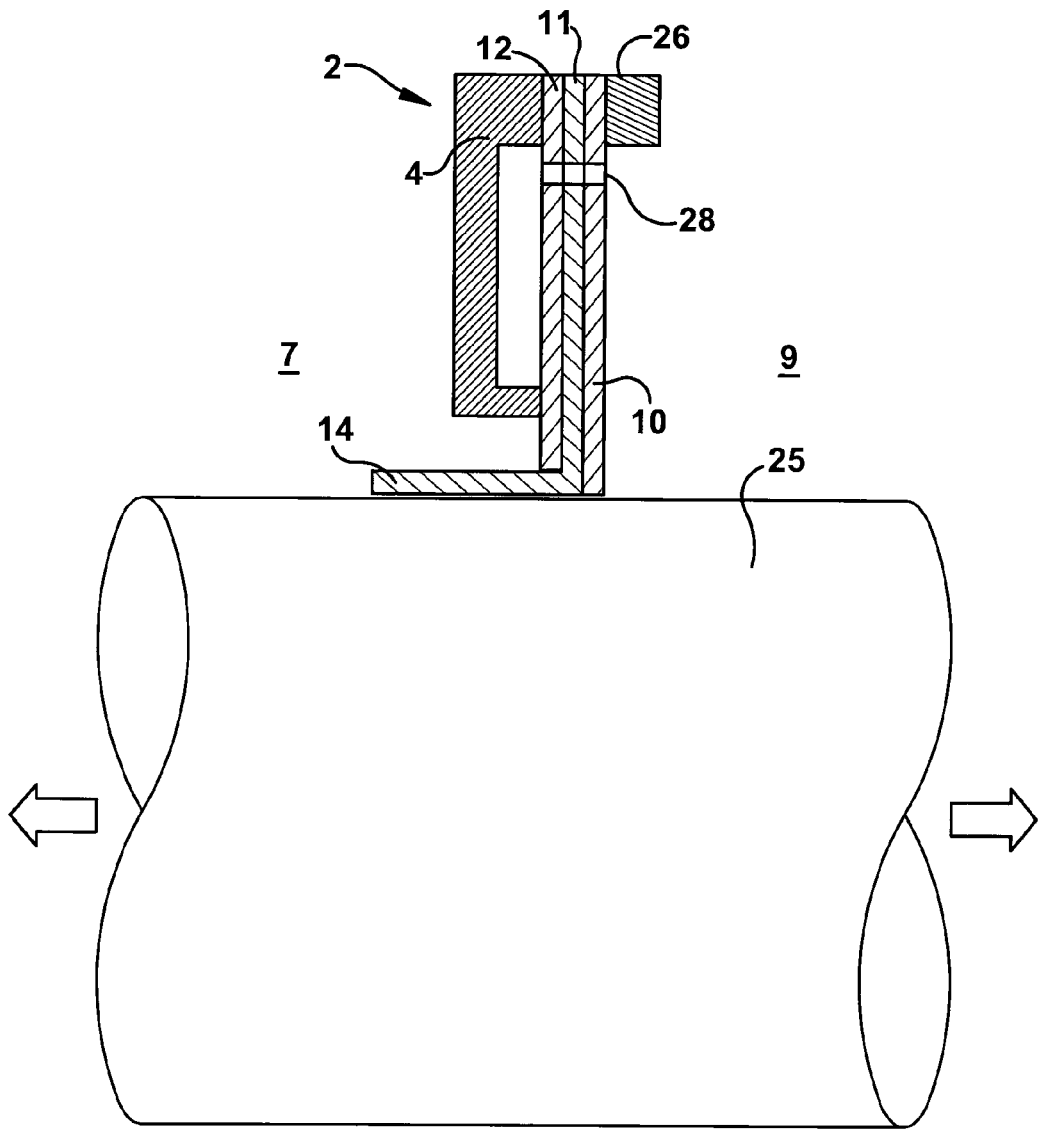
FIG. 2 is a drawing showing the sealing apparatus from a side view and its engagement with a rotating means.

The Finger Seal:

Referring to FIGS. 1 and 2, in various embodiments, the finger seal presented herein involves an annular assembly installed between a high pressure upstream zone 9 sealed off from a downstream low pressure zone 7. As stated previous, the finger seal contains two main elements: low-pressure 11, 12 and high-pressure 10 laminates mounted in a staggered mode respective to one another. Each low-pressure laminate 11, 12 contains flexible finger elements 18 (see FIGS. 1 and 4) sequentially distributed around the circumference and protruding from a common torus. The flexible finger elements 18 being compliant and allowing for radial and axial motion without damage. The assembly contains two low-pressure laminates 11, 12 that contain interspersed and staggered lifting pads 14 oriented axially towards the low-pressure region. The two low-pressure laminates 11, 12 being interlaced or interlocked in some fashion. Such an interlacing or interlocking reducing leakage. Optionally, the seal may contain a third high pressure laminate 10 that does not contain pads and is mounted in a staggered position with regard to the adjacent, downstream axially positioned padded laminate. This third high pressure laminate 10 is designed to block air passage through the finger seal body. In another embodiment an optional spacer 24 may be located between the low pressure laminate 11, 12 and high pressure laminate 10, or behind the high pressure laminate and in between the latter and the backplate 4. Such a spacer 24 is typically a blank spacer, in that it has no grooves and/or serrations, but in various embodiments can include grooves or serrations.

The interlocked pads 14, from the two layers of low pressure laminates, are designed to provide aerodynamic lift for the fingers 18 of both the padded 14 and the unpadded layer, as the rotating shaft 25 operates underneath the pads 14. The undersides of the pads having hydrodynamic lifting surfaces in a circumferential direction. Once the padded laminates 11, 12 and pads 14 themselves are lifted by the aerodynamic self-acting stream this causes, by way of radial friction, the unpadded layer 10 to lift as well. The benefit obtained is a non-contacting compliant seal interface that has a potentially unlimited life time. In one embodiment the pads are designed to have the wedge in an axial direction in order to facilitate hydrostatic lifting. In another embodiment the pads are designed to be slanted in the axial direction to allow for adequate hydrostatic lifting. In another embodiment, there exists no axial wedge on pads 14. The pads 14 themselves may be the same size or a different size based upon the fluid flow desired. As such, various configurations/embodiments of the low pressure laminate setup are described herein.

One basic element of the seal is formed by machining a series of uniformly curved slots which originate from a common diameter in an annular ring. The ring is commonly referred to as a laminate 10, 11, 12 due to its small axial dimension, in some embodiments being of the order of 0.015 in to 0.040 in. The finger seal concept usually includes at least two layers of finger laminates (in additional embodiments more layers are possible), a front plate 26 and a back plate 4. The finger seal laminates are positioned with respect to each other such that fingers 18 in one laminate block the gaps or interstices in the subsequent laminate (See FIGS. 4a and 4b). Early fully pad-less finger seal designs mounted with a pre-load showed operational leakage, wear, and power loss characteristics similar to those of brush seals. However, these seals have been manufactured at less than 50% of the cost of a brush seal. Further work expanded on the early finger seal designs with a non-contacting type finger seal that includes hydrodynamic lift pads. These self-acting hydrodynamic features represent a significant advance of the state of the art from both sealing effectiveness and potential unlimited lifespan.

In one embodiment the finger seals/fingers are shaped in arcs of circles whose center is offset and the centers are circles spaced according to the number of fingers that compose the laminate containing the fingers and are placed on geometric locus on the form of a circle. In another embodiment, the fingers are formed by an inner arc and an outer arc of a circle, where each arc originates from geometric centers offset with respect to the geometric center of the laminate and the origin of the inner arc and outer arc are located on two separate geometric loci in the form of circles, the center of these circles offset with respect to one another and to the geometric center of the laminate and the number of centers forming the locus of each circle corresponding to the number of fingers that compose the laminate.

Various loads and/or preloads are possible with the finger design. In one embodiment the fingers/pads 18, 14, are arranged so as to preload shaft 25, in essence being designed to force the pads in a preloaded condition onto shaft 25. In another embodiment the fingers/pads 18, 14 are arranged so as to be in line to line contact (i.e. zero clearance) with shaft 25 with minimal load against the shaft. In still another embodiment the fingers/pads 18, 14 are arranged so as to allow a small space or gap between the fingers/pads and the shaft 25. In each embodiment, upon shaft rotation, the pads lift in a manner allowing for no contact with the shaft while in operation.

Application:

As stated previous, the invention has primary application as a sealing improvement means for compressors and turbines. The application in turbines involves both gas and steam turbines. Additional applications include the use of finger seals in improving operation and efficiency of liquid pumps or any liquid moving device that needs a seal between high and low pressure zones, and/or where a rotating element needs a seal against a stationary element. Utilizing this invention, significant improvements are made versus bearing and shaft seals. In each instance, efficiencies over longer periods of time improve as the seals eliminate the normal wear and tear seen with conventional seals.

Additional Embodiments

The basic geometry of the dual pad finger seal assembly represented in the invention is comprised of multiple elements (See FIGS. 1-4): (a) two low pressure finger laminates 11, 12, both containing hydrodynamic lifting pads 14; (b) a high-pressure finger laminate 10 containing no pads; (c) a back plate 4 containing a manifold 32 used for pressure equalization; and (d) a front plate 26 with a radial oriented recess to direct the flow properly towards the seal body.

Each one of the low-pressure laminates 11, 12 end at the lower part with a pad like structure extending in the axial direction towards the low-pressure section of the seal and faces the rotating element. The pads 14 of each laminate are assembled around a circumference in a single, continuous and around the circumference, assembly.

Each laminate can, in one embodiment, contain multiple pads, with the number of such pads determined by design. In one embodiment, the pads are supported by compliant fingers 18. Each of the two low-pressure laminates 11, 12 contains equally spaced, sequentially arranged finger elements 18 extending from a common torus separated by interstices cut to allow free and independent motion of each finger 18.

The torus wherefrom the fingers 18 protrude contains a number of pressure equalization holes 28 positioned to match the voids of the crenellated structure machined downward from the outer diameter of the backplate 4. The two low-pressure laminates 11, 12 can also function as stand alones with or without the addition of the third pad-less laminate 10.

Fingers 18 can have variable thicknesses and shapes designed to optimize compliance and react time to follow the rotor movements. The pads 14 of these two laminates are oriented in the same direction and are assembled in a sequential and staggered position. Each laminate contains pressure equalization holes 28 connected with the manifold structure lodged in the backplate 4.

The construction of the laminates 10, 11, 12 follows a specific geometric methodology based on a circle of centers that contains the centers of the arcs of circle that form the body of the finger. The arcs of the circles may be parallel with each other, but they can be constructed such that they are not parallel to each other. The arcs defining the shape of the fingers are arcs of circles whose center are offset by a predetermined amount and are arranged along the circumference of a circle of centers. The shape of the pad bottoms are self-acting surfaces circumferentially and in some embodiments axially. Thus the padded fingers contain wedge like surfaces both in the axial and circumferential direction, or optionally in only the circumferential direction. The shape of pad tops may be in various shapes and variable surface thicknesses to minimize out of plane motion and rotation with respect to the finger supporting same. The pad top face is slanted at an angle and joining the bottom of the finger leg through an arc of circle engrossing the cross section and thus strengthening the heel of the pad and acting against a rotation of the heal. This geometry is designed to prevent out of plane motion, as well as rotation of the heal. In one embodiment, a fillet extends in a circumferential direction along the circumferential length of the pad. Such a fillet is used to prevent rotation of the pad and to reduce the inducement of fatigue due to vibration and/or cyclical motion. Such a fillet can be, but is not limited to, a triangular design, rectangular design or a circle/arc design. Continuous designs similar to the arc designs offer additional strength due to a lack of a point of initiation for wear.

The two pad laminates contain specific geometries that allow them to interlock. The circumferential side of each of the pads is formed in a wedge like geometry that allows adjacent pads to engage one another and mate while lifting and thus reduce the leakage flow from in-between the pads. Each pair of sequential pads is formed from one larger and one smaller pad in the first configuration, or it can be formed from equal sized pads in a second configuration. That is, the width of each pad in the circumferential direction will subtend a different arc of circle in the first configuration. The width of each pad in the circumferential direction subtends the same arc of circle in the second configuration.

Figure 3:
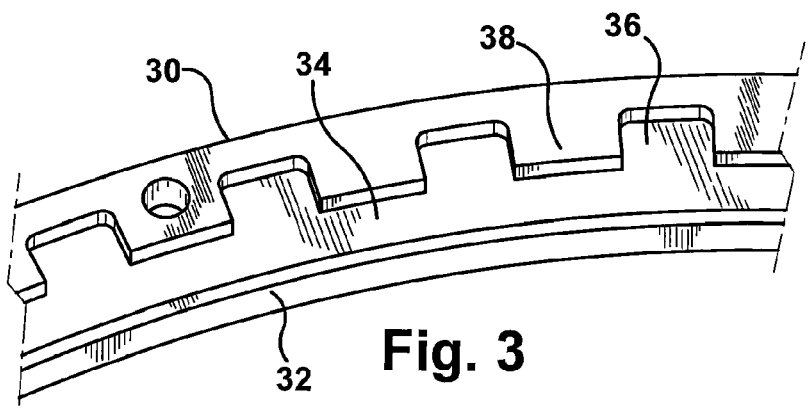
FIG. 3 is a drawing of the backplate detailing the flow channels.

FIG. 3 shows how the backplate 30 (labeled as 30 here to show detail but labeled as 4 elsewhere) formed out of a single element has the toroidal form of the finger seal laminates. The backplate 30 is intended to axially support the assembled structure of the fingers laminates and prevent the laminates from bending out of plane axially when subject to a different pressure environment. The backplate inner diameter forms a circle that is larger in diameter than the diameter of the circle on which the upper surfaces of the pads is located. The diameter of this circle can be varied in order to change the mechanical and operational properties of the seal in general and of the fingers in particular. The backplate contains a pressure dam 32 that is directly in contact with the surface of the fingers. The pressure dam is meant to close the manifold 34 at its lower diameter and serve as well to support the fingers against bending in the axial direction. The backplate manifold communicates with the notches 36 cut in the crenellated spaces 38, which notches are in turn aligned and in are in contact with pressure equalization orifices located in the torus of the finger laminates. The manifold may optionally contain an additional support circumferential rib that prevents further axial deformation of the body of the fingers.

Figure 4A:
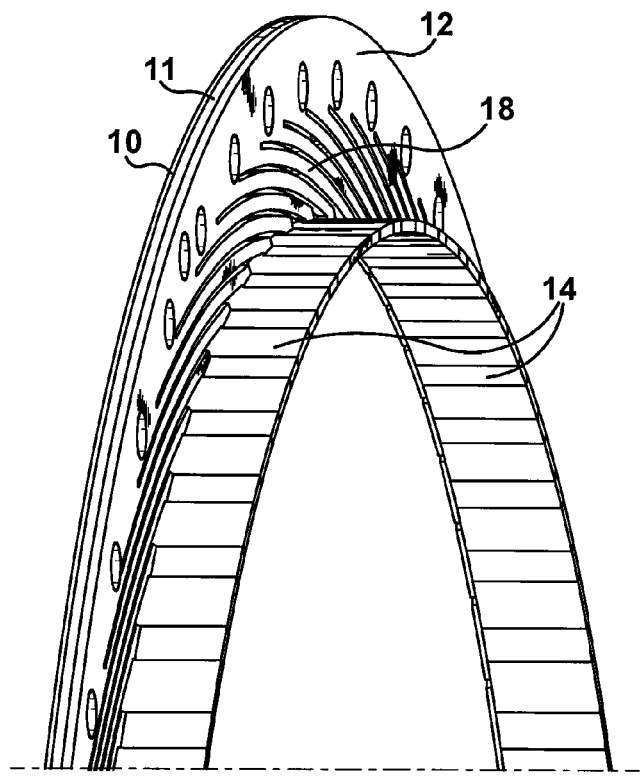
FIGS. 4A and 4B are drawings of one embodiment showing the two low pressure laminates with one high pressure laminate and its engagement with the rotor.
Figure 4B:
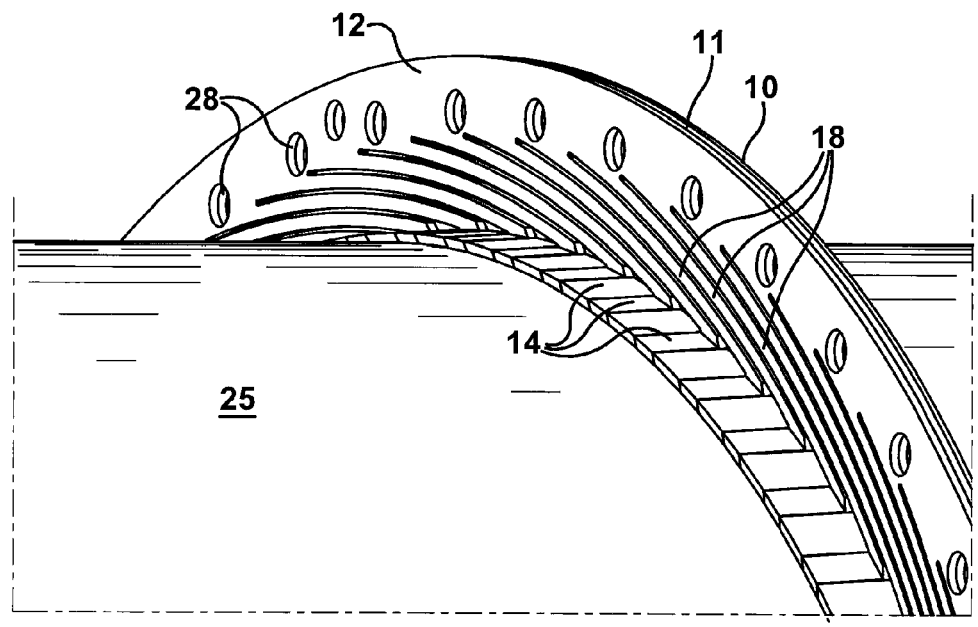
Figure 5:
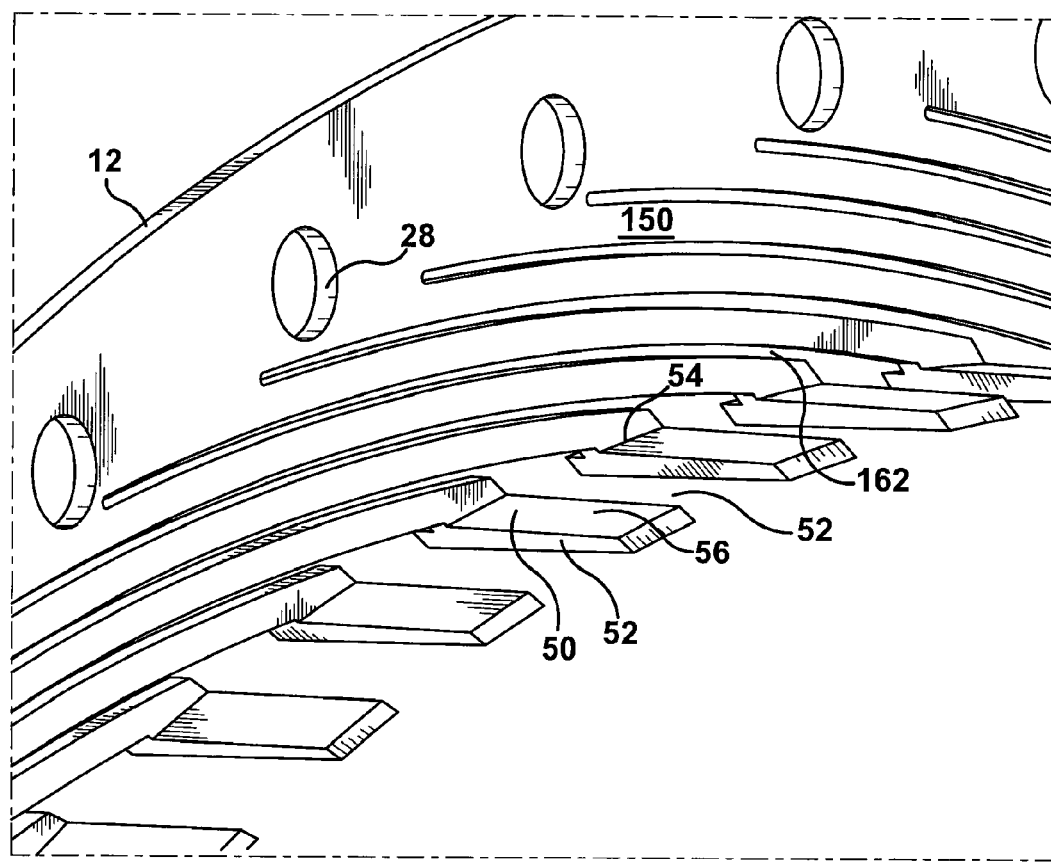
FIG. 5 is a drawing of one of the low pressure laminates as seen from the low pressure side.

Basic Finger/Pad Configuration:

The basic configuration (as shown in FIGS. 4A and 4B) contains two layers of low-pressure padded fingers 11 and 12. It may optionally contain an additional third layer 10 of high pressure unpadded finger laminate. The high-pressure third layer unpadded fingers laminate straddles and covers the interstices of the immediately adjacent low pressure layer.

As detailed in FIGS. 5 through 8, pads 50, 60 are oriented axially on the same side. In one embodiment the pads are designed to lift under the hydrodynamic effect created by the interaction between their underside and the rotating shaft. Both pads 50, 60 are designed with underside self-lifting surfaces in the circumferential direction. The interaction between the pads self-lifting surfaces and the rotor creates a pressure exerting upwards and motioning the pads in an upward direction. Both pads 50, 60 are designed with self-lifting surfaces also in the axial direction that cause the pad to lift under axial static pressure, even though there is no rotation. The pads 50, 60 have circumferential directional surfaces 52 shaped at an angle 62 so as to match one another upon meeting. The lifting of the pads that cause the meeting of surfaces 52, 62 is designed as a sealing mechanism. Optionally, pads 50, 60 end sides are slanted at an angle normal to the radius of the rotor and at that point upon exercise of the self lifting pressure surfaces 52, 62 engages in order to reduce leakage between adjacent pads in the axial direction.

Figure 6:
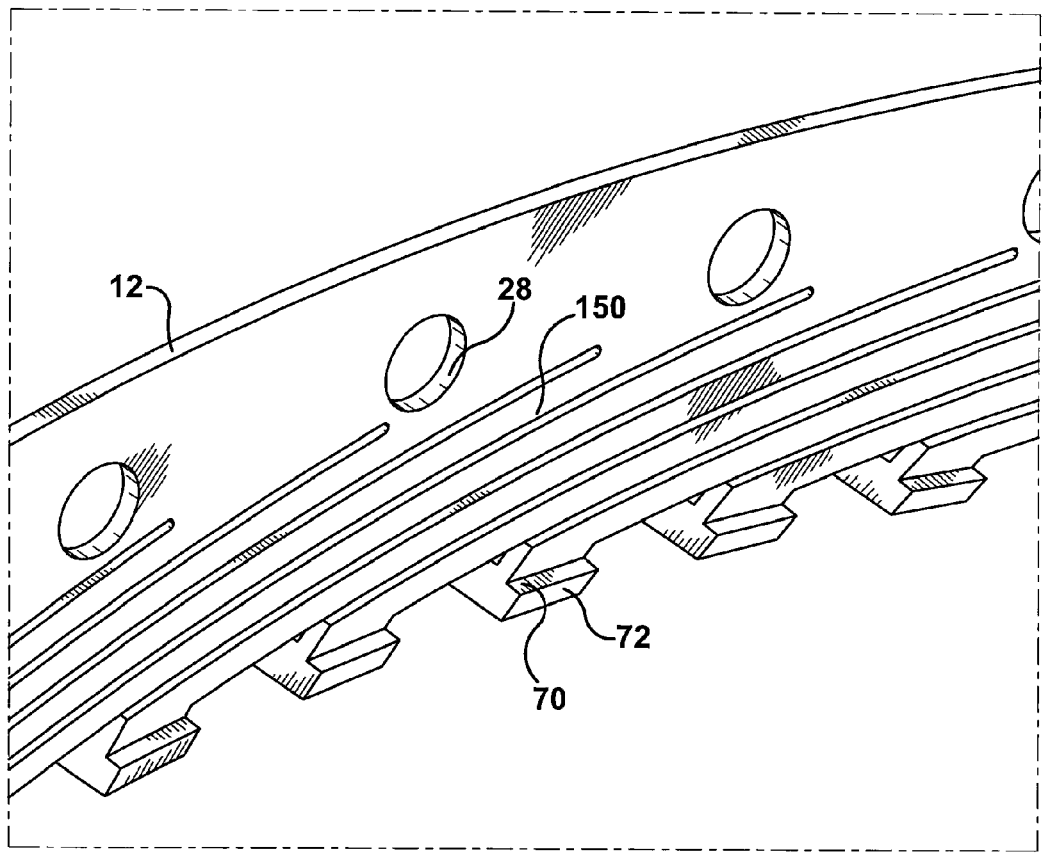
FIG. 6 is a drawing of one of the low pressure laminates as seen from the high pressure side.

Pad 60 and pad 50 (see FIGS. 5,7) have fillets to ensure the proper position of the pads with regard to the backplate and the shaft surface. The pad 50 and pad 60 have fillets 54 and 64 at the joining with the fingers as a pad out-of-plane anti-rotation feature and to ensure the proper position of the pads with regard to the backplate and the shaft surface. The surfaces 66 and 56 can be inclined or parallel with the axis of the shaft and join the fillets 64 and 54 on the side of the finger. The geometry of surfaces 70 and 72, FIG. 6, are designed as an additional sealing mechanism when mating with the low pressure laminate 11. This geometry accommodates the fitting space between 11 and 12. Furthermore the holes 28 are matched with one another and communicate with crenellated notches 36 in the backplate for pressure equalization.

Figure 7:
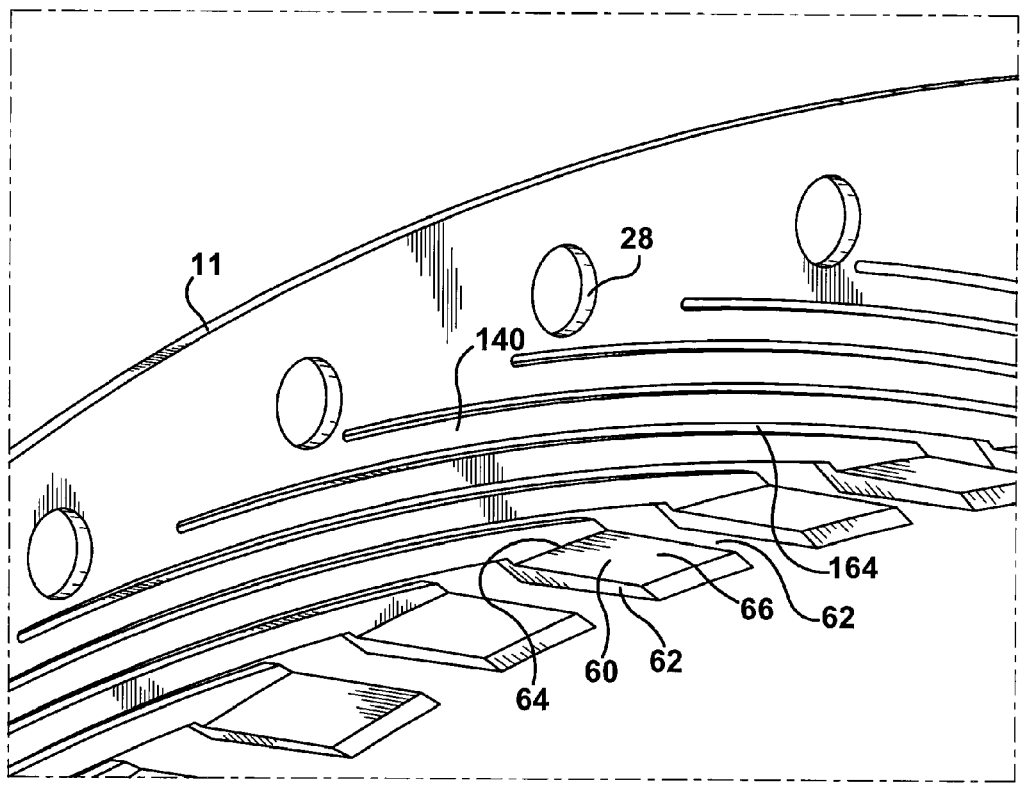
FIG. 7 is a drawing of another low pressure laminate as seen from the low pressure side.
Figure 8:
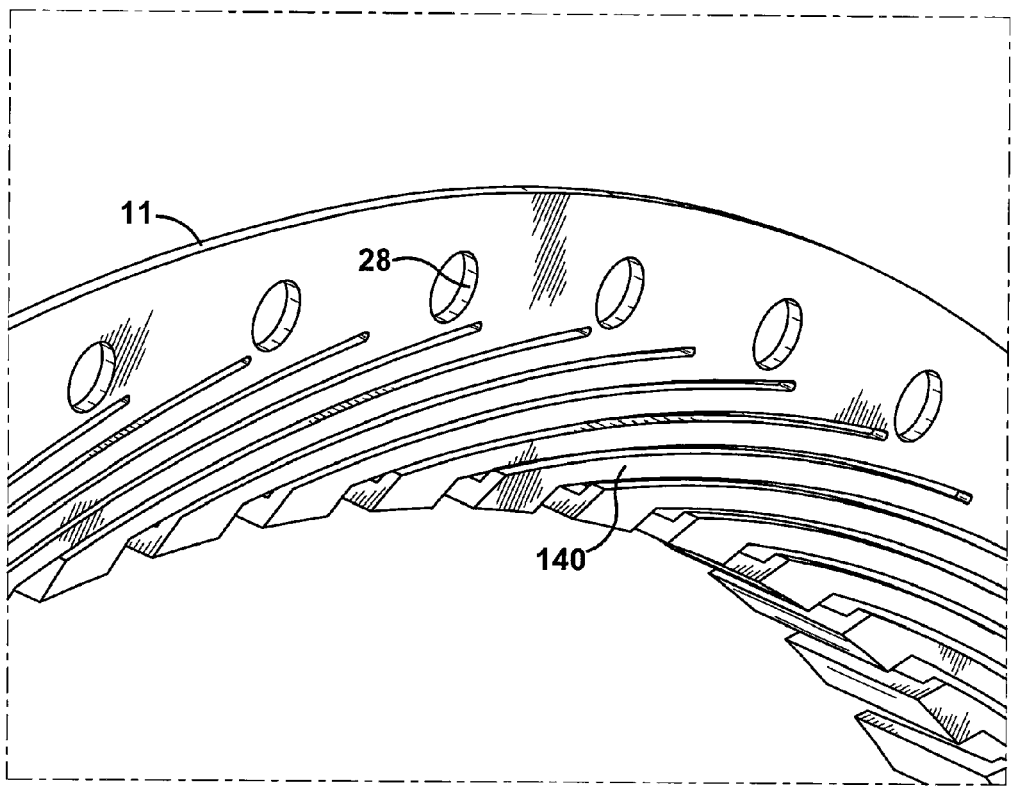
FIG. 8 is a drawing of another low pressure laminate as seen from the high pressure side.
Figure 9:
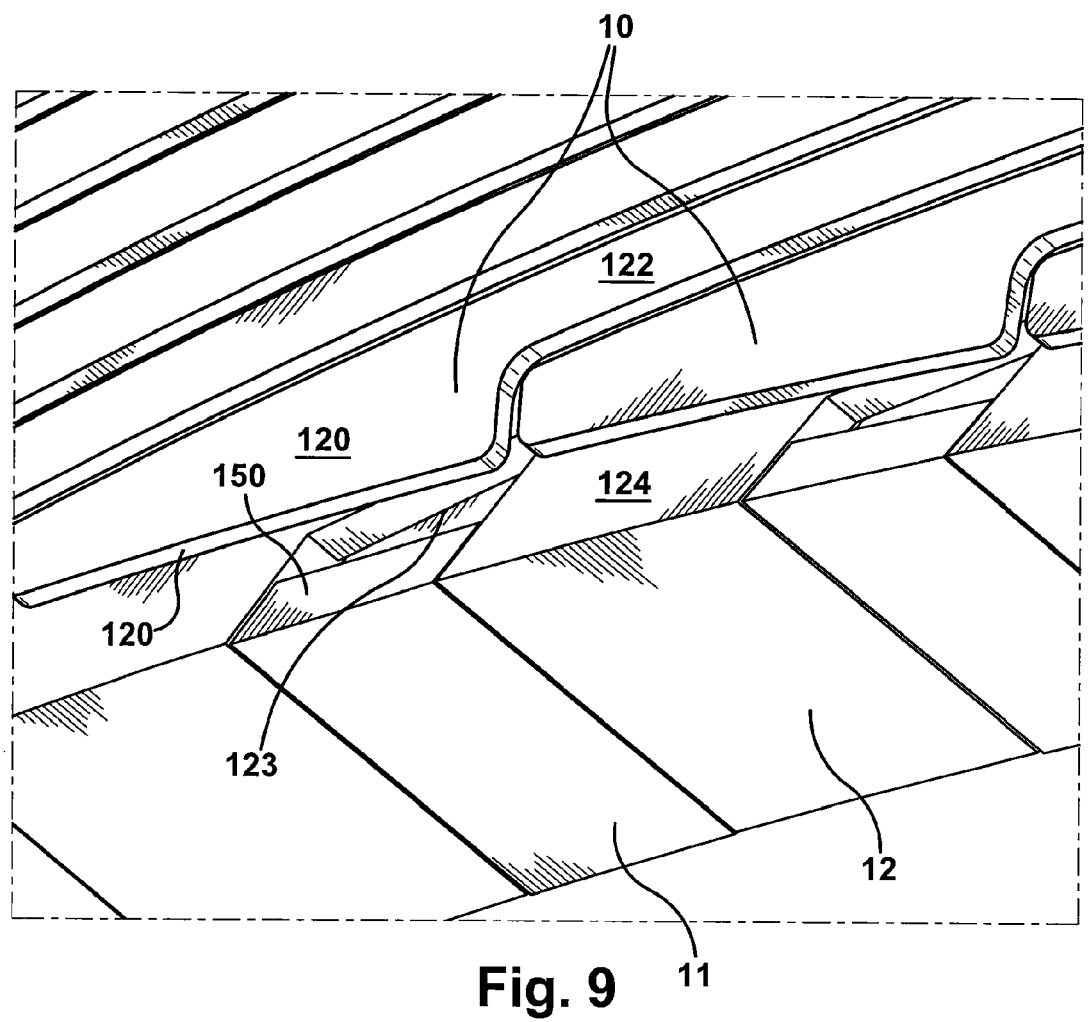
FIG. 9 is a drawing showing the two low pressure laminates, and the high pressure laminate assembled to form the sealing mechanism, view is shown from the high pressure side.

The third layer high pressure laminate 10, see FIG. 9, is mounted in a staggered arrangement with regard to the preceding laminate, where foot 120 of finger 122 of high pressure laminate 10 seals against surface 124 of the laminate 12 and surface 150 of laminate 11 and therefore closes cavity 123. Laminates 11, 12 and 10 fit together, as detailed in FIGS. 4 and 9 (in FIG. 9 the designation for 11 and 12 details the pad, even though the entire laminate is intended). Laminate 11 is mounted staggered to laminate 12 such that fingers 140 of 11 (FIG. 7) laminate cover the interstices 162 of laminate 12 (see FIG. 5). Pads 50 (FIG. 5) and 60 (FIG. 7) are then interlaced and interlocked. Fingers 122 of laminate 10 (FIG. 9) are mounted staggered and cover interstices 164 of laminate 11 (FIG. 7).

Figure 10A:
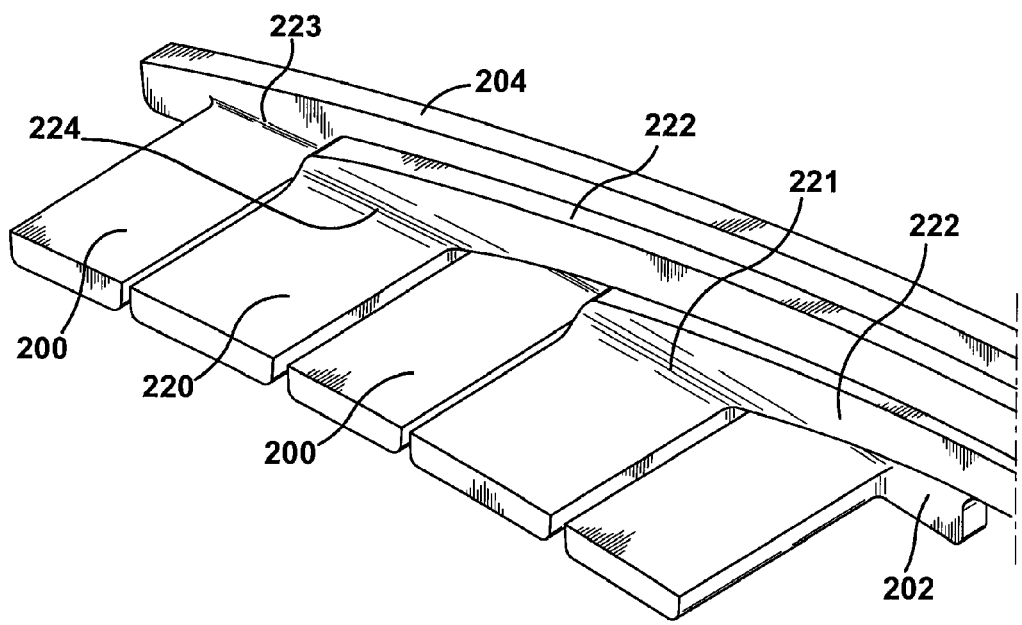
FIGS. 10a and 10b are one configuration of the low pressure laminates.
Figure 10B:
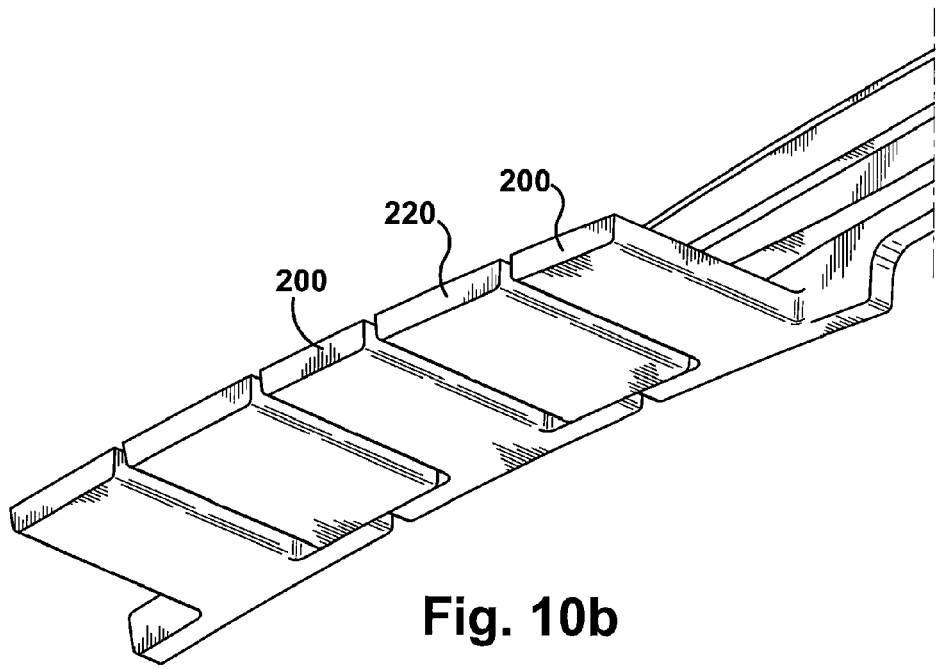

Configuration 1:

Configuration 1, a two padded interlaced low pressure laminate assembly as shown in FIGS. 10a and 10b, contains two layers of low-pressure padded fingers. Optionally, it may contain an additional third layer of high-pressure unpadded finger laminate. The high-pressure third layer unpadded fingers laminate straddles and covers the interstices of the immediately adjacent and preceding low pressure layer. The pads 200 and 220 are oriented axially on the same side. In one embodiment pads 200 and 220 possess straight end-sides in the circumferential direction. In another embodiment pads 200 and 220 possess angled sides so as to lineup and upon lifting engage each other's sides and further reduce leakage. Pad 220 has a larger fillet 221 than pad 200 which utilizes fillet 223. The geometry of structures 204, 200 and 202 accommodates the geometry of the structures 220 and 222. The finger 222 and the pad 220 are joined through an engrossed fillet 221.

Figure 11A:
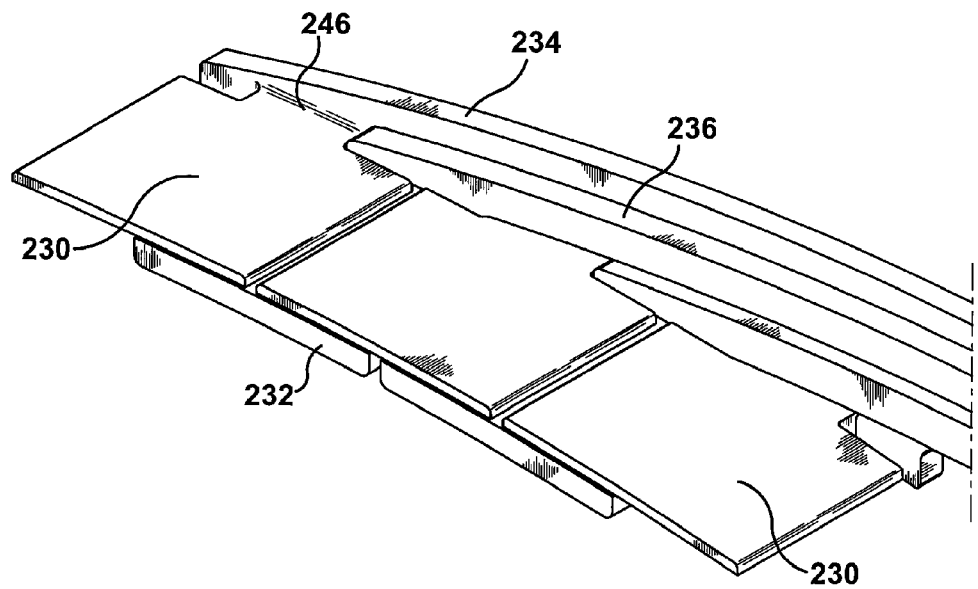
FIGS. 11a and 11b details another configuration of the low pressure laminates, utilizing one layer of top-hat pads.
Figure 11B:
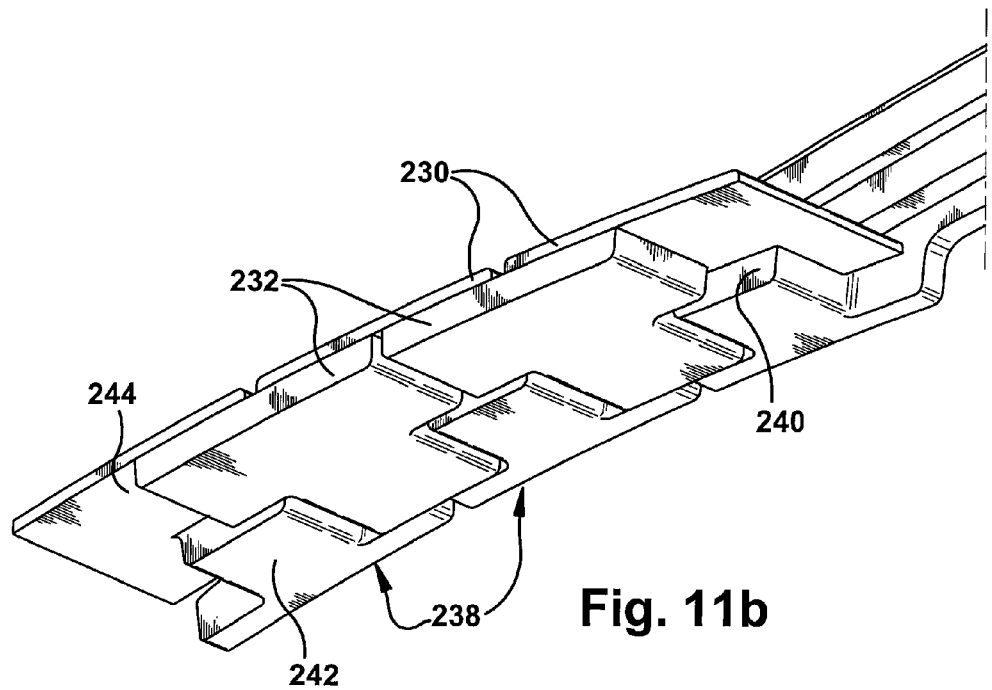

Configuration 2:

Configuration 2, a doubled two padded low pressure laminates assembly, with second layer top-hat capped pads as shown in FIGS. 11a and 11b contains two layers of low-pressure padded fingers. It may contain an additional third layer of high-pressure unpadded finger laminate that straddles and covers in its arrangement the interstices of the immediately adjacent low pressure layer. The high pressure third layer of unpadded fingers laminate straddles and covers in its arrangement the interstices of the immediately adjacent low pressure layer. This layer may be optionally installed. The pads 232 and 230 are oriented on the same side in the axial direction. The pads 230 and 232 have straight end-sides in the circumferential direction. The 232 pad is T-shaped in order to accommodate the geometry claimed for pad 230 and interlock properly with the latter. The 230 pad is interlocked on top of the 232 pad while its supporting finger 234 is located behind the 236 finger. The geometry of the 230 pad is in the shape 238 claimed in FIG. 11b, formed out of a smaller parallelepiped that fits in space 240 delineated by inside contour formed between two adjacent T-shaped 232 pads. The geometry of the 230 pad is formed out of the 242 and 244 elements machined out of a single solid component. The 242 element fits without interference into space 238. The top hat 244 fits on top of element 232. The finger 234 and the pad 230 are joined through an engrossed fillet 246 whose diameter is set such as to fit element 236 flush and ensure sealing between 234 and 236. The finger 236 and the pad 232 are joined through an engrossed fillet whose diameter is set such as to fit element 234 flush and ensure sealing between 234 and 236.

Figure 12A:
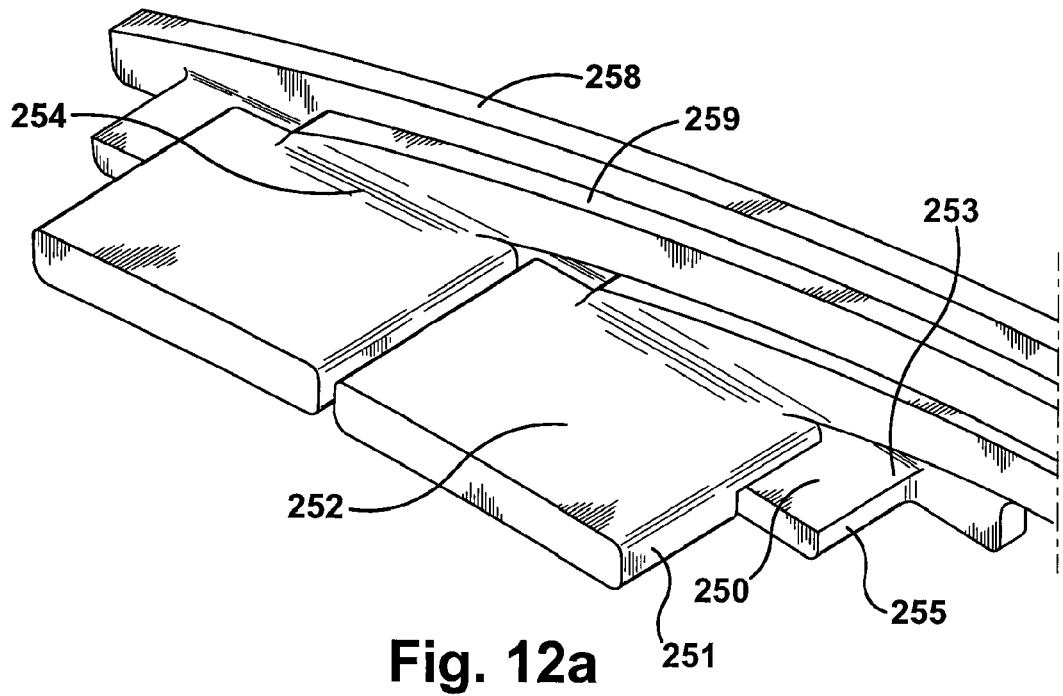
FIGS. 12a and 12b show another configuration showing double two padded low pressure laminate assembly with a second layer bottom surface under scalloped and butting axially against a first layer shorter top-hatless pad.
Figure 12B:
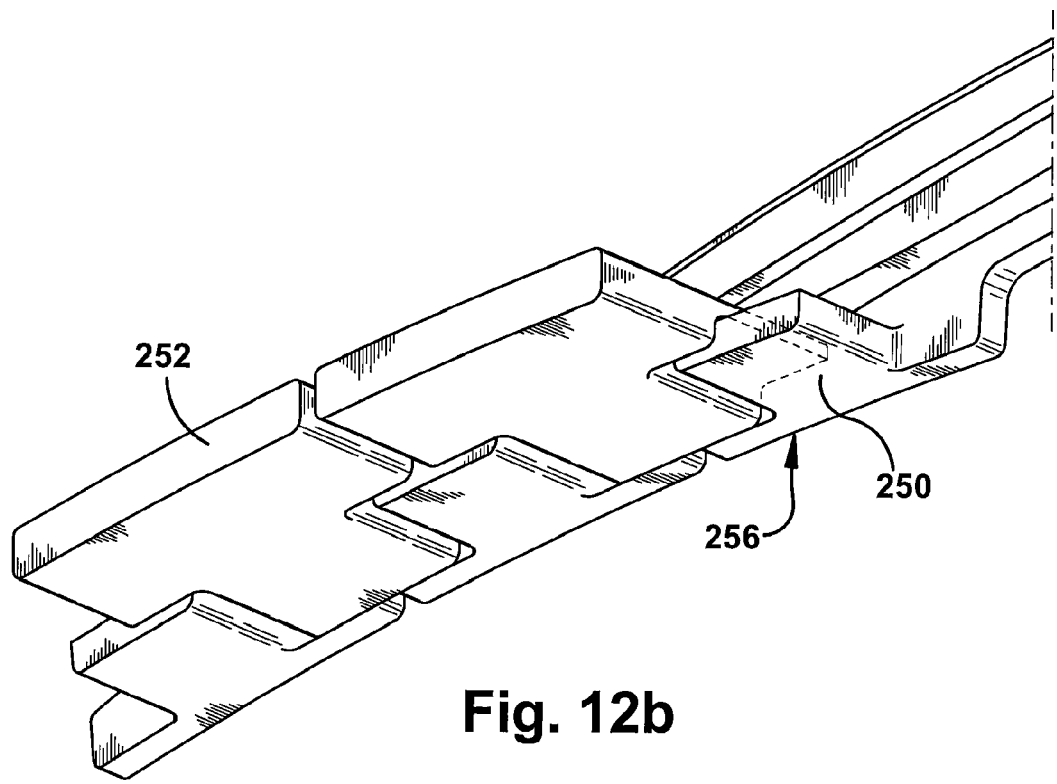

Configuration 3:

Configuration 3, a double two padded low pressure laminate assembly with second layer bottom surface under-scalloped and butting axially against the first layer shorter tophat-less pads is detailed in FIGS. 12a and 12b, contains two layers of low-pressure padded fingers. It may contain an additional third layer of high-pressure unpadded finger laminate that straddles and covers in its arrangement the interstices of the immediately adjacent low-pressure layer. The high pressure third layer of unpadded fingers laminate straddles and covers in its arrangement the interstices of the immediately adjacent low-pressure layer. This layer may or may not be installed. The pads 250 and 252 are oriented on the same side in the axial direction. The pads 250 and 252 have straight end-sides 255, 251, in the circumferential direction. The 252 pad has a larger fillet 254 than the 250 pad with fillet 253. The 252 pad is installed with a scalloped section 256 (marked on FIG. 12b with dotted lines) located under the top surface of the pad. This scalloped region is designed to accommodate the shortened pad 250 and the geometries are designed such to interlock for sealing purposes. The pad 250 is shorter than the pad 252 and designed to fit in the scalloped space 256. The pad 250 and the pad 252 are supported by the fingers 258 and 259 that descend from their respective circumferential tori. The geometry of pad 250 is in the shape claimed in FIG. 12b, formed out of a smaller parallelepiped that fits in space 256 delineated by inside contour formed between two adjacent T-shaped pads 252. The top hat of pad 252 fitted on top of pad 250 contains a scalloped area 256 aimed at receiving pad 250. The finger 258 and the pad 250 are joined through an engrossed fillet 253.

Figure 13A:
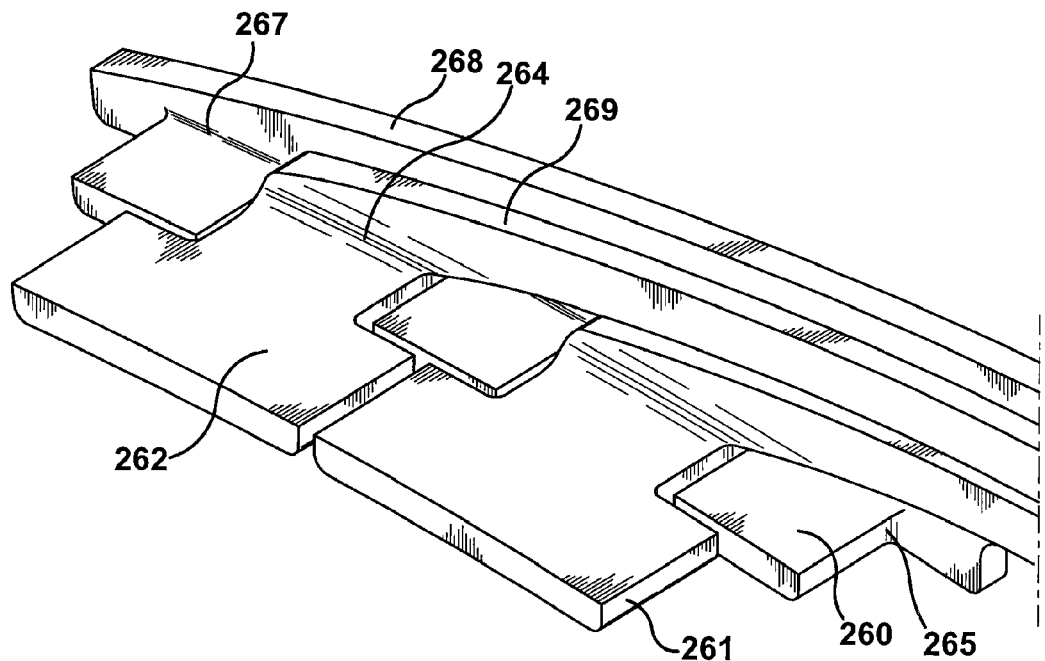
FIGS. 13a and 13b are another configuration detailing a double two padded low pressure laminate assembly with first layer T-shaped and second layer with short pads fitting in the slots of the T.
Figure 13B:
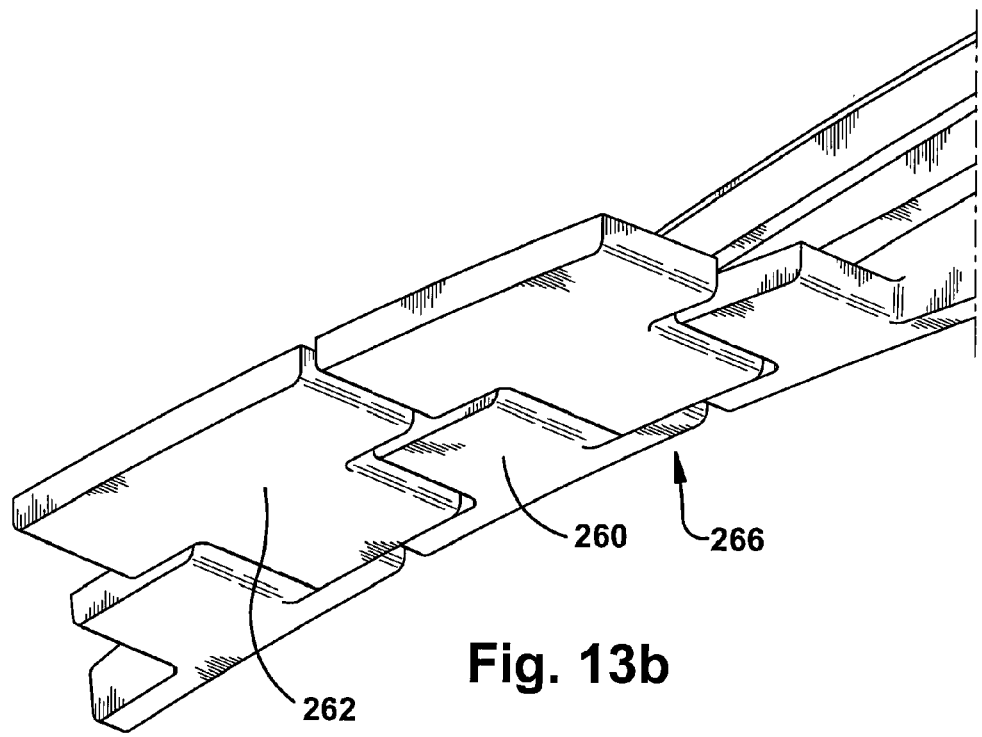

Configuration 4:

Configuration 4, a double two padded low-pressure laminates assembly, with first layer T-shaped and second layer with short pads fitting in the slots of the T, (see FIGS. 13a and 13b) contains two layers of low pressure padded fingers and may contain an additional third layer of high-pressure unpadded finger laminate that straddles and covers in its arrangement the interstices of the immediately adjacent low pressure layer. The high-pressure third layer of unpadded fingers laminate straddles and covers in its arrangement the interstices of the immediately adjacent low pressure layer. This layer may optionally be installed. The pads 260 and 262 are oriented on the same side in the axial direction. The pads 260 and 262 have straight end-sides 261, 265 in the circumferential direction. The 262 pad has a larger fillet 264 than the 260 pad containing fillet 267. The 262 pad is T-shaped. The space 266 outlined by two adjacent 262 T-shaped pads is designed to accommodate the shortened 260 pad and the geometries are designed such to interlock for sealing purposes. The pad 260 is shorter than pad 262 and designed to fit in the scalloped space 266. Pad 262 and pad 260 are supported by the fingers 268 and 269 that descend from the circumferential torus. The geometry of pad 260 is in the shape claimed in FIGS. 13a and 13b, formed out of a smaller parallelepiped that fits in space 266 delineated by inside contour formed between two adjacent T-shaped pads 262. The top surfaces of pads 262 and 260 are in the same plane. The finger 269 and the pad 262 are joined through an engrossed fillet 264. The finger 268 and pad 260 are joined through an engrossed fillet 267.

Configuration 5:

Configuration 5, a double two padded low pressure laminates assembly, with first layer T-shaped and second layer with short pads fitting in the slots of the T, both layers having antifriction or DLC covered pads, contains two layers of low-pressure padded fingers and may contain an additional third layer of high pressure unpadded finger laminate that straddle and cover in its arrangement the interstices of the immediately adjacent low-pressure layer. This configuration is similar to Configuration 4/FIGS. 13a and 13b with the exception that this embodiment contains antifriction or friction mitigation lining or embedded coating attached to the underside of elements 260 and 262 described in Configuration 4.

Figure 14A:
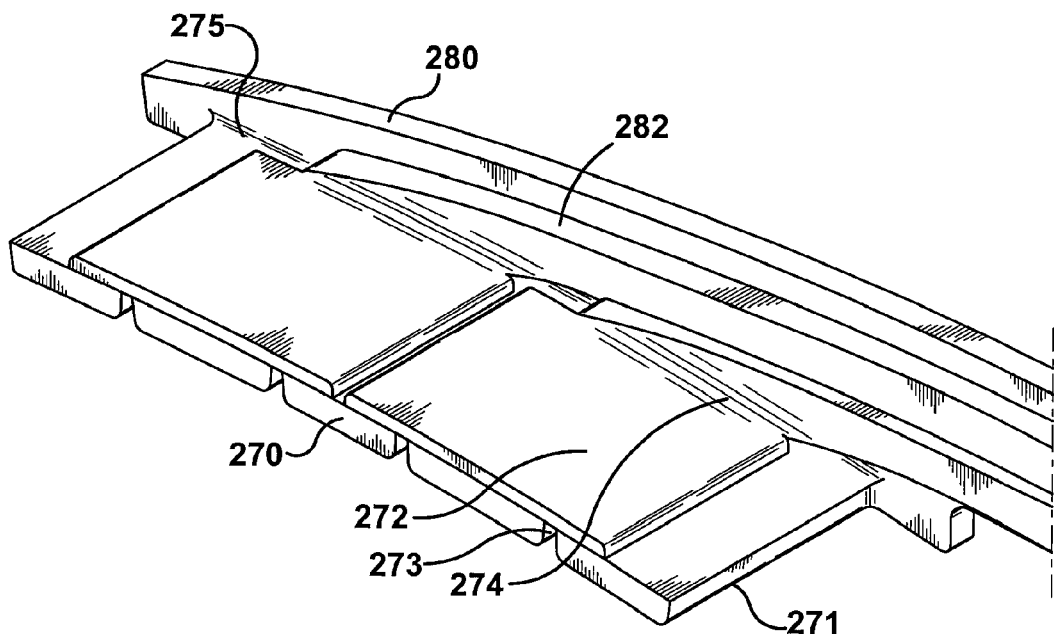
FIGS. 14a and 14b show another configuration with double padded low pressure laminates assembly with a second layer of tophat capped pads.
Figure 14B:
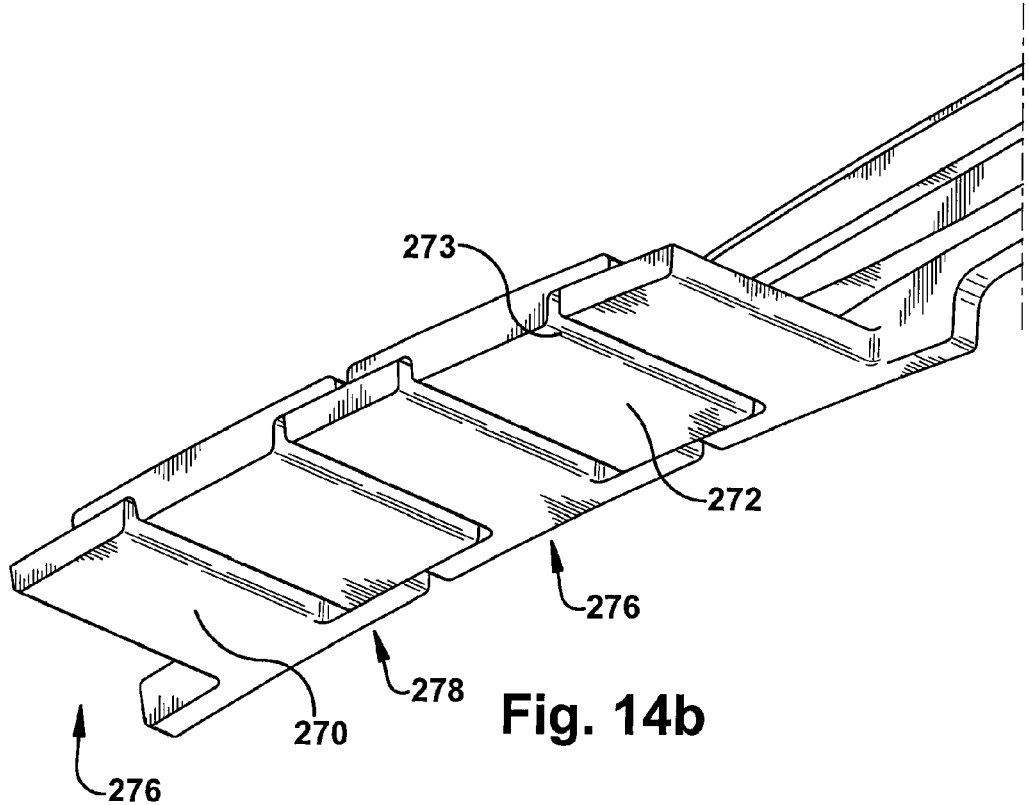

Configuration 6:

Configuration 6, a double two padded low pressure laminates assembly with second layer tophat capped pads, as shown in FIGS. 14a and 14b, contains two layers of low-pressure padded fingers and may contain an additional third layer of high pressure unpadded finger laminate that straddles and covers in its arrangement the interstices of the immediately adjacent low-pressure layer. The high pressure third layer of unpadded fingers laminate straddles and covers in its arrangement the interstices of the immediately adjacent low-pressure layer This layer may optionally be installed. The pads 270 and 272 are oriented on the same side in the axial direction. The pads 270 and 272 have straight end-sides in the circumferential direction 271, 273. The pad 272 has a larger fillet 274 than the pad 270 which connects to the finger 280 possessing fillet 275. Pad 272 is installed with scalloped sections 276 and 278 located under the top surface (top hat) of the pad. Sections 276, 278 are adjacent to one another as part of two adjacent pads 272. These scalloped regions are designed to accommodate each one half of pad 270; thus the pads 272 and 270 geometries are designed such to interlock for sealing purposes. The pad 270 is longer than the pad 272 and designed to fit in the scalloped spaces 276 and 278. The axial ends of the pads terminate in the same plane. The lengths of the two pads do not necessarily have to be the same. Either pad 270 is longer than pad 272 or vice versa. This difference in length is adjusted in order to facilitate hydrodynamic lift. Pad 270 and pad 272 are supported by fingers 280 and 282 that descend from the respective circumferential tori. The geometry of the pad 270 is in the shape claimed in FIGS. 14a and 14b formed out of a smaller parallelepiped that fits in the space provided by scalloped regions 276, 278 delineated by inside contour formed between two adjacent top-hated pads 272. The top hat of pad 272 fitted on top of pad 270 and contains the scalloped under the top cavity. The finger 282 and the pad 272 are joined through an engrossed fillet 274. The finger 280 and pad 270 are joined through an engrossed fillet 275.

Figure 15A:
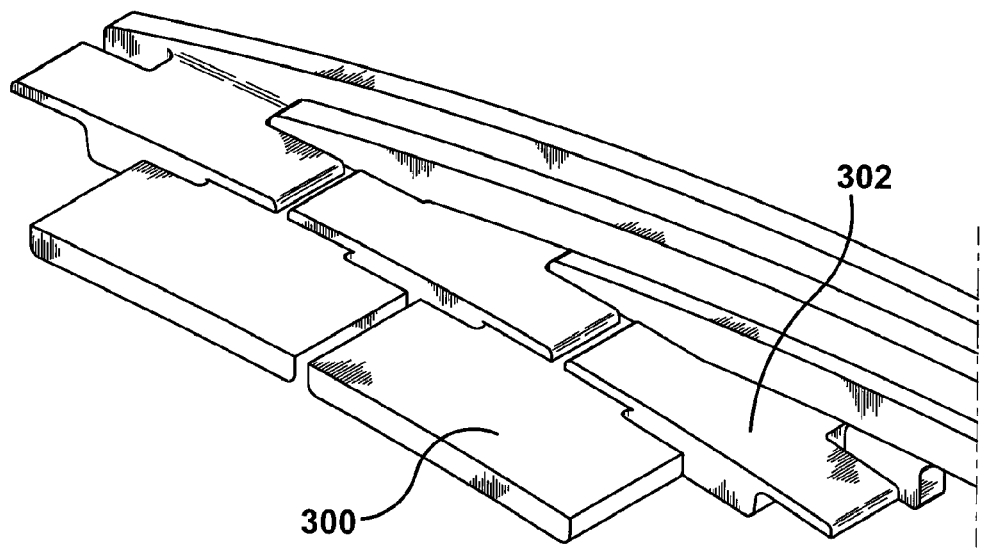
FIGS. 15a and 15b details another configuration with double two padded low pressure laminates assembly with second layer tophat capped pads.
Figure 15B:
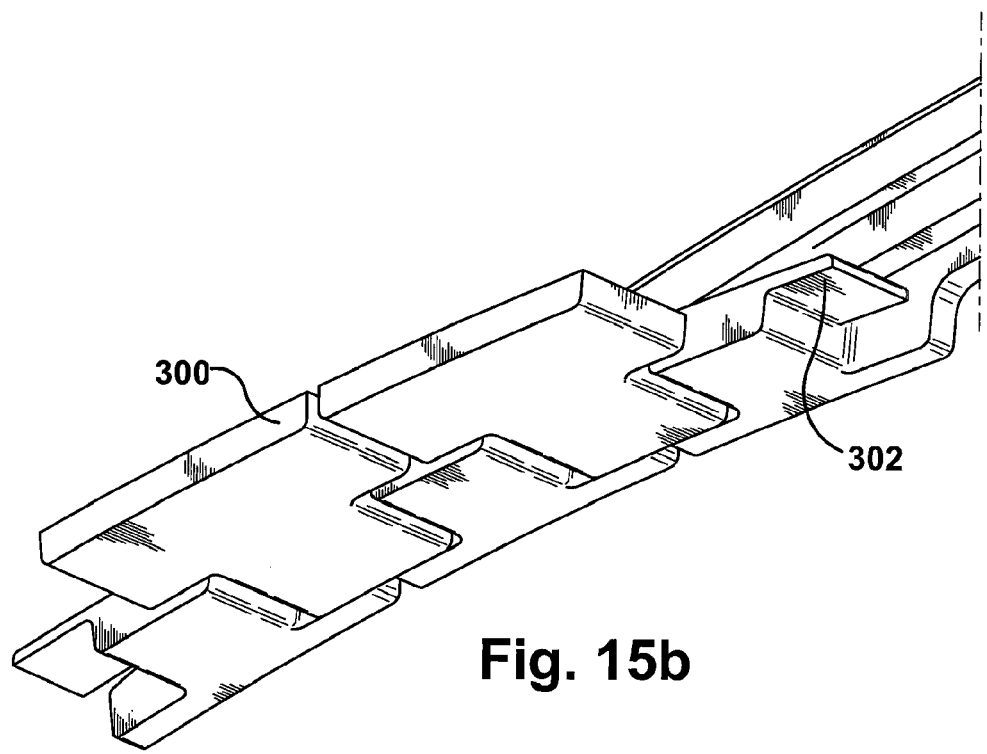

Configuration 7:

Configuration 7, a double two padded low-pressure laminate assembly with second layer tophat capped pads as shown in FIGS. 15a and 15b, contains two layers of low pressure padded fingers and may contain an additional third layer of high pressure unpadded finger laminate that straddles and covers in its arrangement the interstices of the immediately adjacent low-pressure layer. The first low pressure laminate layer 300 interlocking with the second low pressure laminate layer 302 in a tophat fashion similar to the arrangement described in previous configurations, but with a staggered stacking arrangement.

Figure 16A:
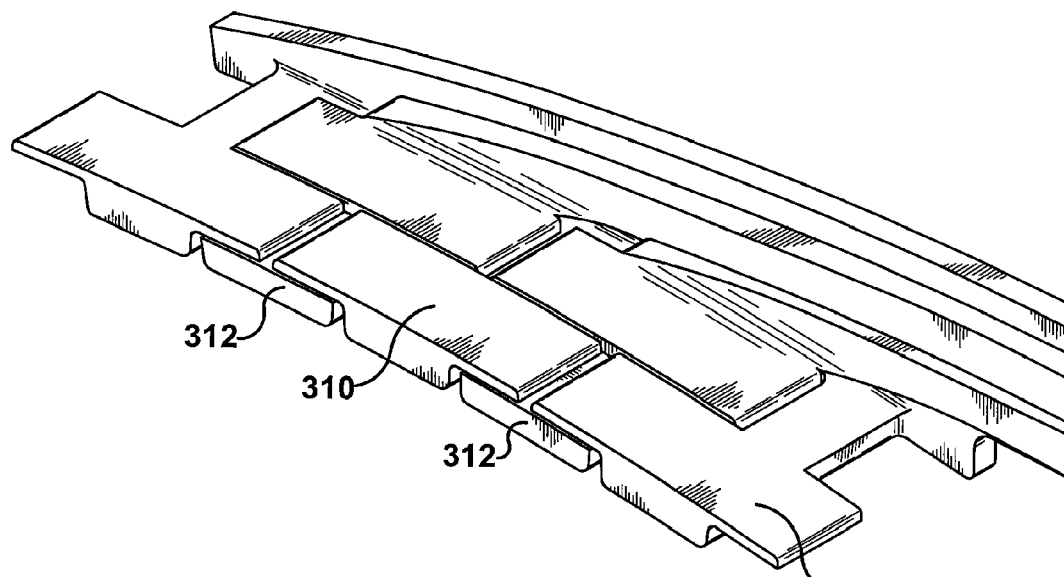
FIGS. 16a and 16b are another configuration with double two padded low pressure laminates with both pads top capped.
Figure 16B:
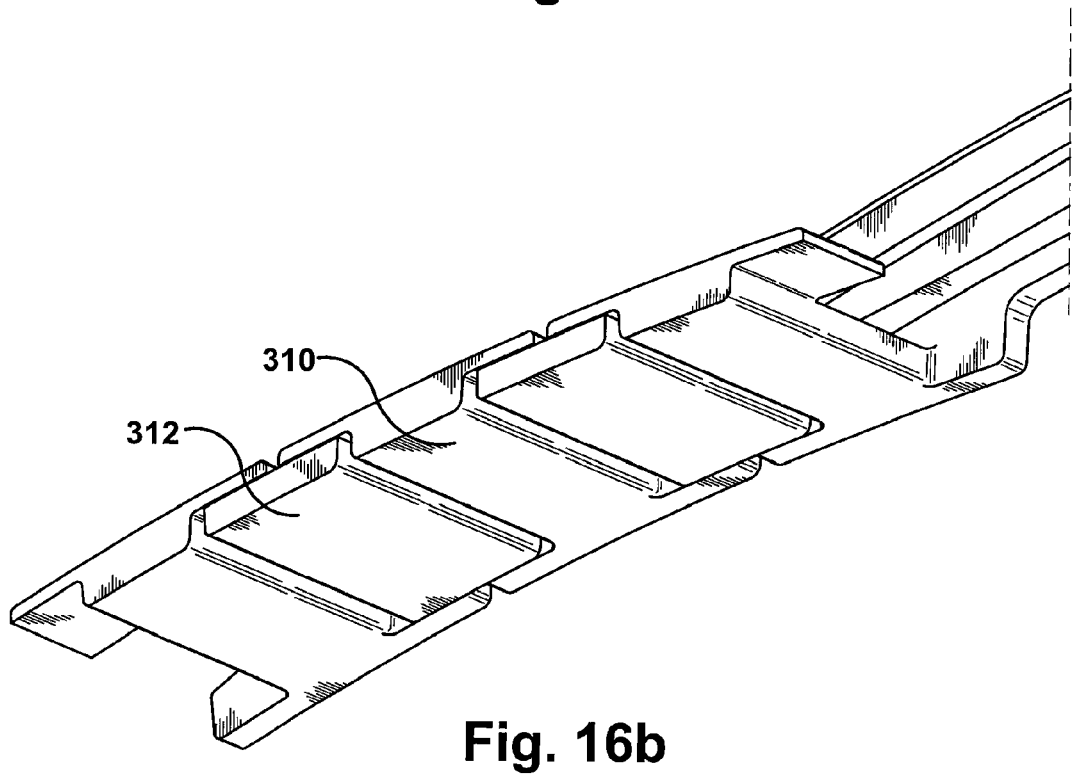

Configuration 8:

Configuration 8, a double padded low pressure laminates assembly with both pads top capped as shown in FIGS. 16a and 16b, contains two layers of low pressure padded fingers and may optionally contain an third layer of high-pressure unpadded finger laminate that straddles and covers in its arrangement the interstices of the immediately adjacent low pressure layer. The first low-pressure laminate layer 310 interlocking with the second low pressure laminate layer 312 in a tophat fashion similar to the arrangement described in previous configurations, but with a staggered stacking arrangement.

Intermediate Wafer

Optionally, an intermediate wafer (also known as a spacer) 24 is installed between the low pressure laminate and backplate 4. Such an apparatus is used to reduce leakage. Although this setup increases friction and resistance to lift, it also cuts flow significantly. Such a setup allows the seal to perform in the range of a brush seal, or better, but with negligible wear.

Figure 17:
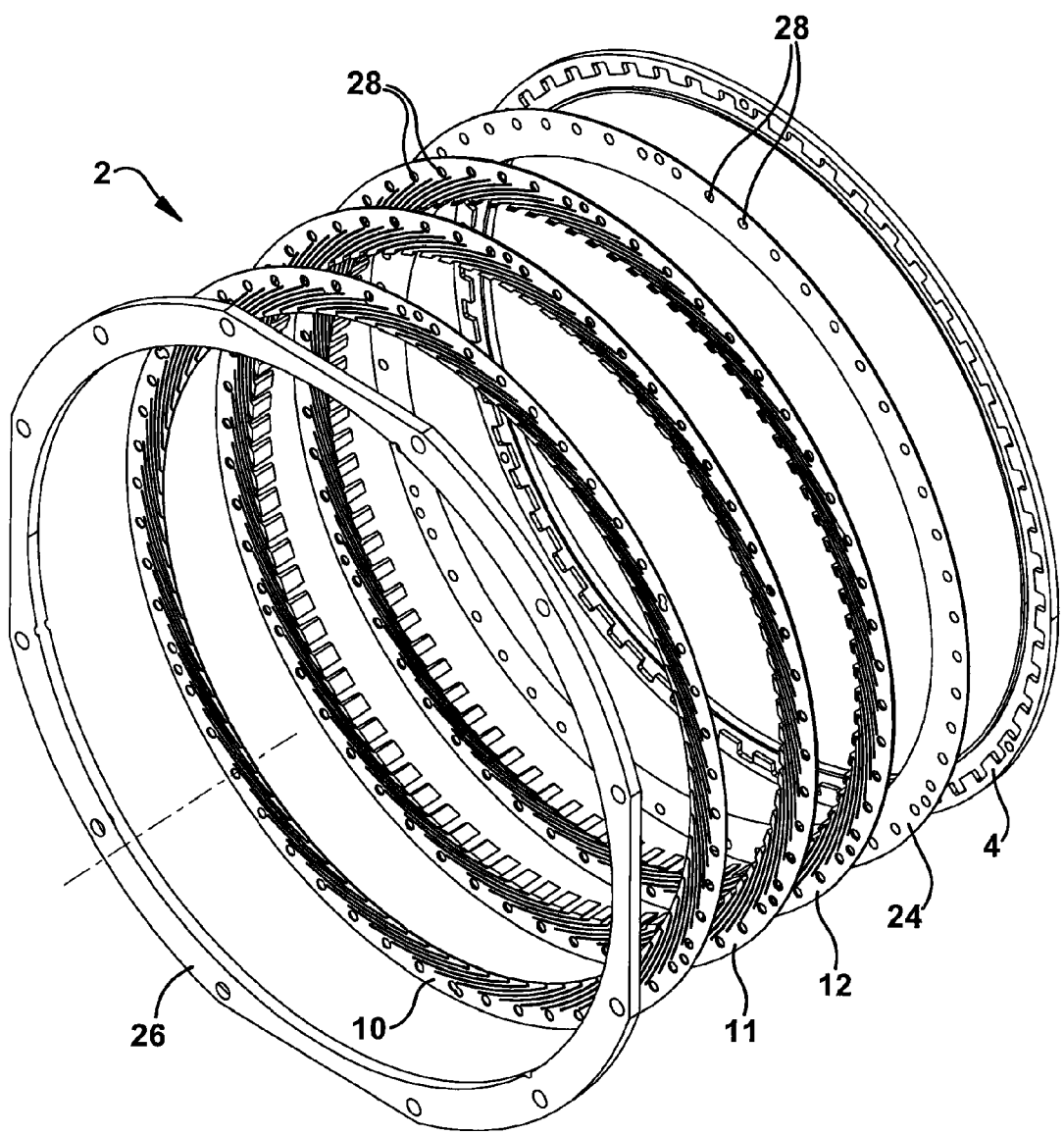
FIG. 17 is a drawing of the sealing apparatus detailing plates, laminates and spacers.
Figure 18:
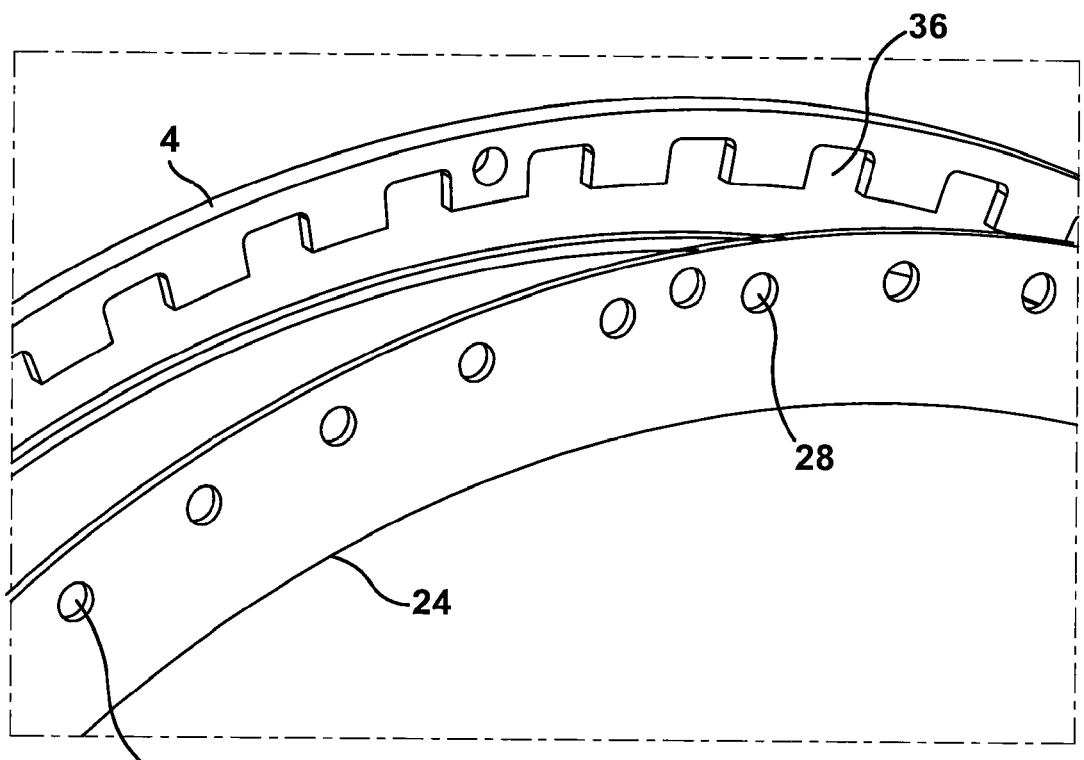
FIG. 18 is a detailed view of the spacer and backplate for one embodiment.

As seen in FIG. 17, wafer 24 is located between backplate 4 and low pressure laminate 12. In this embodiment, another low pressure laminate 11 is immediately adjacent to first low pressure laminate 12. This is followed by high pressure laminate 10 and front plate 26. FIG. 18 further details wafer 24 and backplate 4. As such the flow holes 28, aligned with the crenellated notches 36, can act as a means for flow leakage and a pressure equalization means.

Figure 21:
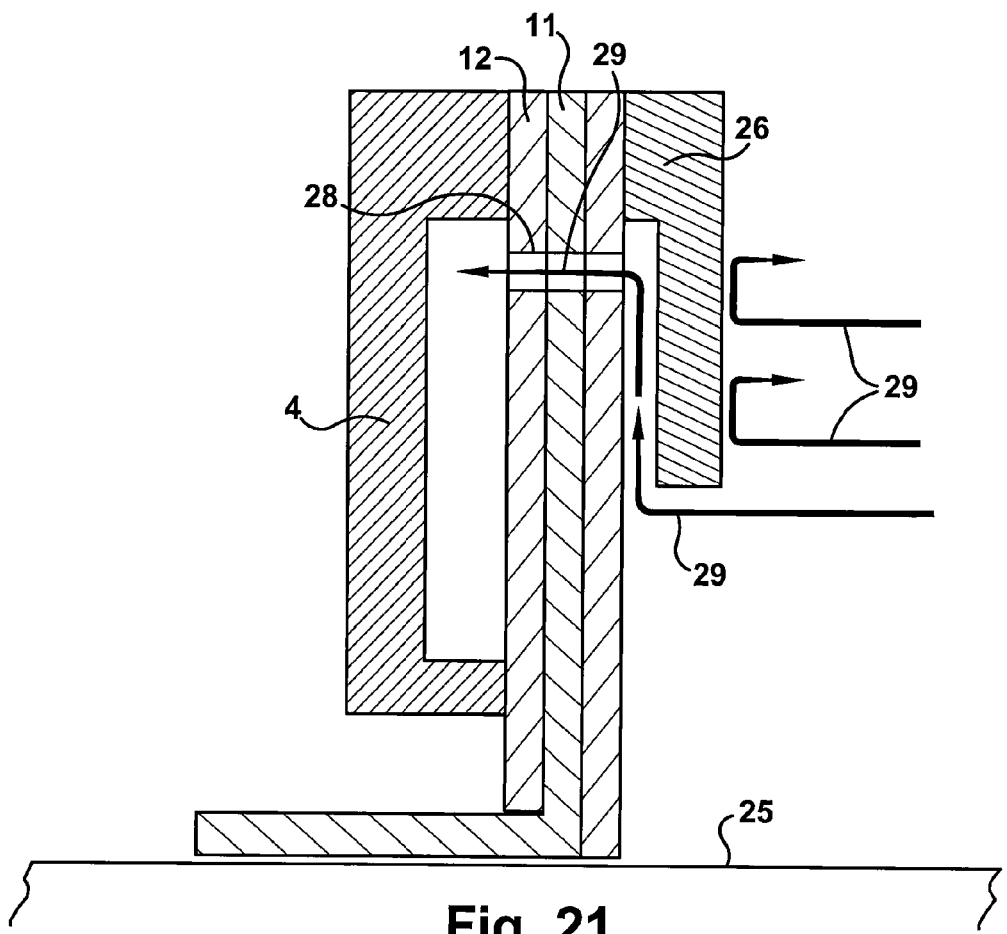
FIG. 21 is a side view detailing fluid flow thru the sealing apparatus.

FIGS. 19, 20 and 21 detail the fluid flow 29 (see flow arrows) thru the series of plates. FIG. 19 providing a setup without wafer 24. In the setup lacking wafer 24 the fluid essentially leaks out thru the backplate 4. FIG. 20 showing the addition of a wafer 24 traps the fluid flow 29 in the sealing apparatus 2. This trapping significantly reducing flow and allowing for improved performance. FIG. 21 details the fluid flow 29 in relations to a standard setup and in relation to the rotor/shaft 25.

Figure 22:
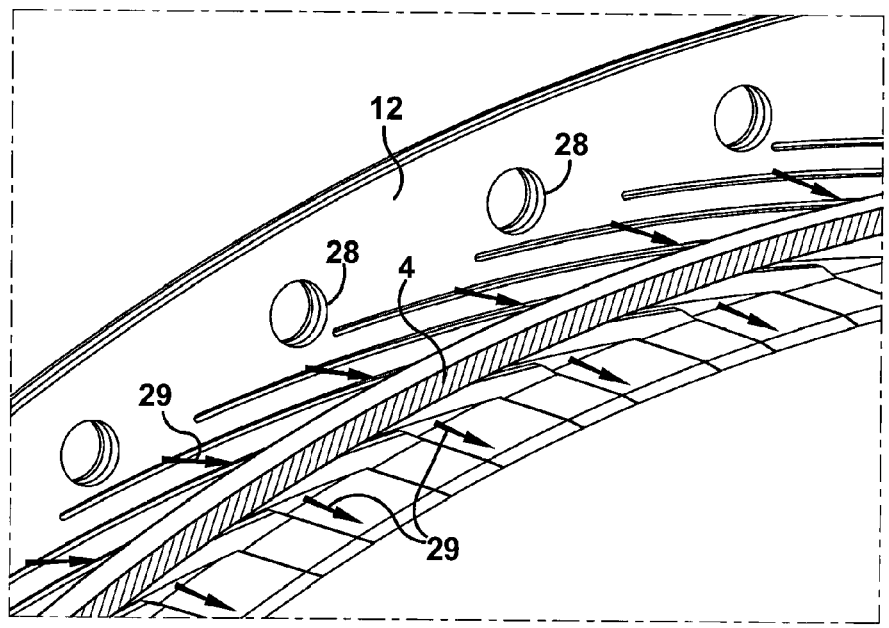
FIG. 22 is a drawing of the interaction between the low pressure laminate and the inner-lip of the backplate.

FIG. 22 details an alternate view of the low pressure laminates 11, 12 interacting with the innerlip or dam (see also 32 of FIG. 3) of the backplate 4. The fluid flow 29 is shown in its pathway for escaping fluid flow/air.

The wafer 24 can be alternatively placed at other positions in the sealing apparatus to improve fluid flow 29 characteristics. The placement being dependent on fluid flow desired.

Although the invention has been described in detail with particular reference to certain embodiments detailed herein, other embodiments can achieve the same results. Variations and modifications of the present invention will be obvious to those skilled in the art, and the present invention is intended to cover in the appended claims all such modifications and equivalents.

The invention claimed is:

1. An annular sealing apparatus comprising:
a body defining a cylindrical opening designed to receive a rotating member;
the cylindrical opening and the rotating member bounding a high pressure fluid region and a relatively lower pressure fluid region there between and inhibiting fluid leakage between the high fluid pressure region and lower fluid pressure region;
a backplate having a manifold with protrusions in the manifold plane;
a frontplate with a circumferentially and radially oriented recess directing flow;
at least two finger seal laminates interposed between high and lower fluid pressure regions;
the at least two finger seal laminates containing compliant finger seals;
one of the at least two finger seal laminates defining a cavity;
the at least two finger seal laminates forming a passageway between the high fluid pressure and low fluid pressure regions;
the finger seals circumferentially extending finger elements wherein the finger elements each include a plurality of spaced integral fingers and wherein the fingers define gaps there between;
the finger seals positioned such that the fingers of each laminate extend from a common torus, the torus containing holes to equalize pressure;
the finger seals of adjoining finger seal laminates positioned such that the fingers of each laminate block any gaps of the adjacent laminate to reduce fluid leakage and allow for pressure equalization;
the finger seals each containing at least one lift pad extending from the respective finger elements;
the lift pads adapted to be arranged circumferentially and axially adjacent to the rotating member whereby each lift pad is operative to be self acting to create hydrodynamic lift when the rotating member reaches a sufficient rotating speed or the hydrostatic axial pressure differential reaches a sufficient level; and the lift pads of the circumferentially adjoining laminates being interlaced and upon lift engaging one another in an interlocking manner.

2. The annular sealing apparatus of claim 1 wherein the lift pads from the finger seal laminates are approximately the same size and alternate in the same concentric diameter around the circumference of the seal.

3. The annual sealing apparatus of claim 1 wherein the lift pads have slanted sides.

4. The annular sealing apparatus of claim 1 wherein the lift pads are a different size between adjacent finger seal laminates.

5. The annular sealing apparatus of claim 1 wherein the lift pads from the finger seal laminates form interlocking layers whereby the outermost layer has a larger surface area with a tophat design and interlocks with a T-shaped innermost layer.

6. The annular sealing apparatus of claim 1 wherein the lift pads from the finger seal laminates form interlocking dual layers whereby the outermost layer has a under-scalloped pad and the inner layer is devoid of tophat pads interspersed and butting axially against the outermost layer.

7. The annular sealing apparatus of claim 1 wherein the lift pads from the finger seal laminates form interlocking layers whereby the finger seal laminates alternate in the same concentric diameter around the circumference of the seal and alternate between T-shaped lift pads and rectangular shaped lift pads.

8. The annular sealing apparatus of claim 1 wherein the lift pads from the finger seal laminates form interlocking dual layers whereby the finger seal laminates alternate in a staggered diameter around the circumference of the seal and alternate between T-shaped lift pads and top-hat lift pads and the top-hat lift pads cover the T-shaped lift pads.

9. The annular sealing apparatus of claim 1 wherein the lift pads from the finger seal laminates form interlocking dual layers whereby the finger seal laminates alternate in a staggered diameter around the circumference of the seal with top-hat lift pads covering T-shaped lift pads, the top-hat diameter staggered with the outer diameter of the T-shaped pads.

10. The annular sealing apparatus of claim 1 wherein the apparatus includes a high pressure finger seal laminate devoid of lift pads.

11. The annular sealing apparatus of claim 10 wherein at least one spacer is utilized between the high pressure finger seal laminate devoid of lift pads and the at least two finger seal laminates.

12. The annular sealing apparatus of claim 1 wherein the lift pads incorporate antifriction pads and/or a means of mitigating friction between the rotating shaft and the stationary pads.

13. The annular sealing apparatus of claim 1 wherein the lift pads undersides are covered with diamond like coating.

14. The annular sealing apparatus of claim 1 wherein the gaps are interstices.

15. The annular sealing apparatus of claim 1 wherein the finger seal laminates contain void spaces near the outer laminate edge to allow pressure equalization in the apparatus.

16. The annular sealing apparatus of claim 1 wherein a spacer is placed between the backplate and the finger seal laminate.

17. The annular sealing apparatus of claim 1 wherein the fingers are formed by an inner arc and an outer arc of a circle, where each arc originates from geometric centers offset with respect to the geometric center of the laminate.

18. The annular sealing apparatus of claim 17 wherein the origin of the inner arc and outer arc are located on two separate geometric loci in the form of circles, the center of these circles offset with respect to one another and to the geometric center of the laminate and the number of centers forming the locus of each circle corresponding to the number of fingers that compose the laminate.

19. The annular sealing apparatus of claim 1 wherein the lift pads end sides are slanted at an angle normal to the radius of the rotor.

20. The annular sealing apparatus of claim 1 wherein the lift pads are hydrodynamically or hydrostatically floating pads.

21. The annular sealing apparatus of claim 1 wherein the laminates contain pressure equalization holes corresponding to void spaces on the front plate and back plate.

22. A method of inhibiting fluid leakage between a high pressure and a relatively lower pressure region comprising the steps of:

providing an annular sealing apparatus comprising a body defining a cylindrical opening designed to receive a rotating member, the cylindrical opening and the rotating member bounding a high pressure fluid region and a relatively lower pressure fluid region there between and inhibiting fluid leakage between the high fluid pressure region and lower fluid pressure region, a backplate having a manifold with protrusions in the manifold plane, a frontplate with a circumferentially and radially oriented recess directing flow, at least two finger seal laminates interposed between high and lower fluid pressure regions, the at least two finger seal laminates containing compliant finger seals, one of the at least two finger seal laminates defining a cavity, the at least two finger seal laminates forming a passageway between the high fluid pressure and low fluid pressure regions, the finger seals circumferentially extending finger elements wherein the finger elements each include a plurality of spaced integral fingers and wherein the fingers define gaps there between, the finger seals positioned such that the fingers of each laminate extend from a common torus, the torus containing holes to equalize pressure, the finger seals of adjoining finger seal laminates positioned such that the fingers of each laminate block any gaps of the adjacent laminate to reduce fluid leakage and allow for pressure equalization, the finger seals each containing at least one lift pad extending from the respective finger elements, the lift pads adapted to be arranged circumferentially and axially adjacent to the rotating member whereby each lift pad is operative to be self acting to create hydrodynamic lift when the rotating member reaches a sufficient rotating speed or the hydrostatic axial pressure differential reaches a sufficient level, and the lift pads of the circumferentially adjoining laminates being interlaced and upon lift engaging one another in an interlocking manner; and preventing the fluid from flowing from the high pressure region to the low pressure region.

23. The method of claim 22 wherein the annular sealing apparatus includes a high pressure finger seal laminate devoid of lift pads.

24. The method of claims 22 where the annular sealing apparatus includes a spacer placed between the backplate and the finger seal laminate.

* * * * *